(12) United States Patent
Ueda

(10) Patent No.: US 8,356,388 B2
(45) Date of Patent: Jan. 22, 2013

(54) BIAXIAL HINGE MECHANISM AND ELECTRONIC APPARATUS

(75) Inventor: Zentaro Ueda, Tokyo (JP)

(73) Assignee: Sony Corporation, Tokyo (JP)

( * ) Notice: Subject to any disclaimer, the term of this patent is extended or adjusted under 35 U.S.C. 154(b) by 6 days.

(21) Appl. No.: 13/064,752

(22) Filed: Apr. 13, 2011

(65) Prior Publication Data

US 2011/0304250 A1 Dec. 15, 2011

(30) Foreign Application Priority Data

Jun. 10, 2010 (JP) ................................. 2010-132930

(51) Int. Cl.
*E05D 3/10* (2006.01)
(52) U.S. Cl. ....................................................... 16/367
(58) Field of Classification Search .................... 16/367, 16/386, 338–340, 330, 303, 380; 361/679.06, 361/679.27, 679.28, 679.11, 679.12, 679.13; 379/433.12, 433.13; 455/575.1, 575.4, 575.8, 455/550.1, 90.3; 348/373, 333.06, 794; 248/291.1, 248/292.12, 292.13, 919–923
See application file for complete search history.

(56) References Cited

U.S. PATENT DOCUMENTS

| | | | | |
|---|---|---|---|---|
| 5,205,017 A | * | 4/1993 | Wang | 16/367 |
| 5,982,429 A | * | 11/1999 | Kamamoto et al. | 348/333.06 |
| 6,256,837 B1 | * | 7/2001 | Lan et al. | 16/334 |
| 6,798,646 B2 | * | 9/2004 | Hsu | 361/679.06 |
| 2005/0177978 A1 | | 8/2005 | Satoh et al. | |
| 2005/0207104 A1 | * | 9/2005 | Love | 361/683 |
| 2005/0268429 A1 | * | 12/2005 | Akiyama et al. | 16/221 |
| 2006/0218750 A1 | * | 10/2006 | Tajima | 16/367 |
| 2006/0288385 A1 | * | 12/2006 | Vitito | 725/77 |
| 2007/0107492 A1 | * | 5/2007 | Lasalandra et al. | 73/1.88 |
| 2010/0128458 A1 | * | 5/2010 | Nagami | 361/825 |
| 2011/0157843 A1 | * | 6/2011 | Ahn et al. | 361/749 |

FOREIGN PATENT DOCUMENTS

JP 2009-055636 3/2009

* cited by examiner

*Primary Examiner* — Chuck Y. Mah
(74) *Attorney, Agent, or Firm* — Rader Fishman & Grauer, PLLC

(57) ABSTRACT

A biaxial hinge mechanism includes: an opening/closing support section projected toward an outer side of a casing; an opening/closing shaft supported on the opening/closing support section; an outer cover provided to be fixed to the casing so as to hide the opening/closing support section and the opening/closing shaft; a hinge base supported on the opening/closing shaft so as to be rotatable relative to the casing, with the opening/closing shaft as a center axis of rotation; a rotation-restricting section operable to restrict a rotation angle of the hinge base to within a predetermined range; a rotating shaft supported on the hinge base and provided in a direction orthogonal to the opening/closing shaft; and a rotating support section supported on the rotating shaft so as to be rotatable relative to the hinge base, with the rotating shaft as a center axis of rotation.

3 Claims, 21 Drawing Sheets

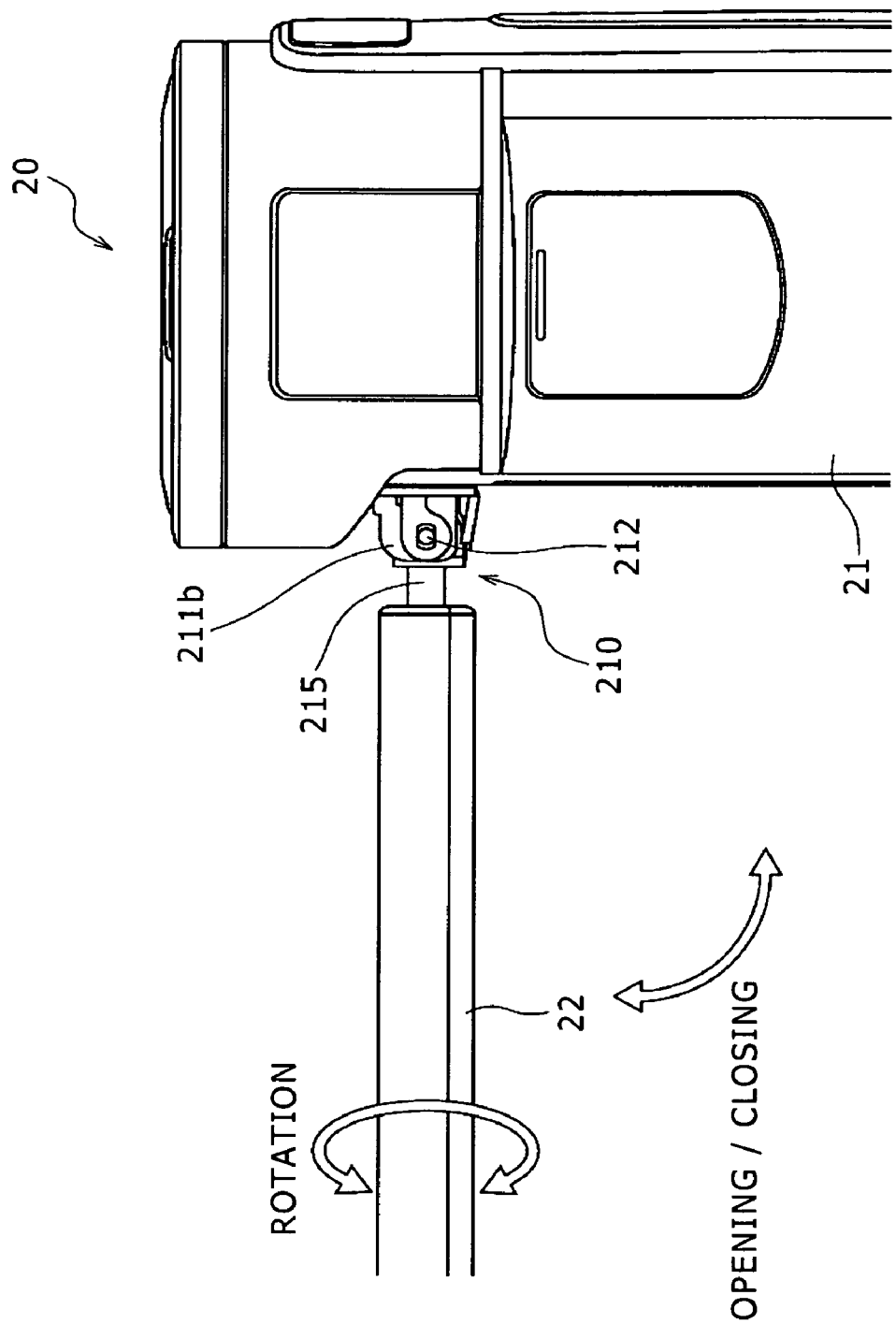

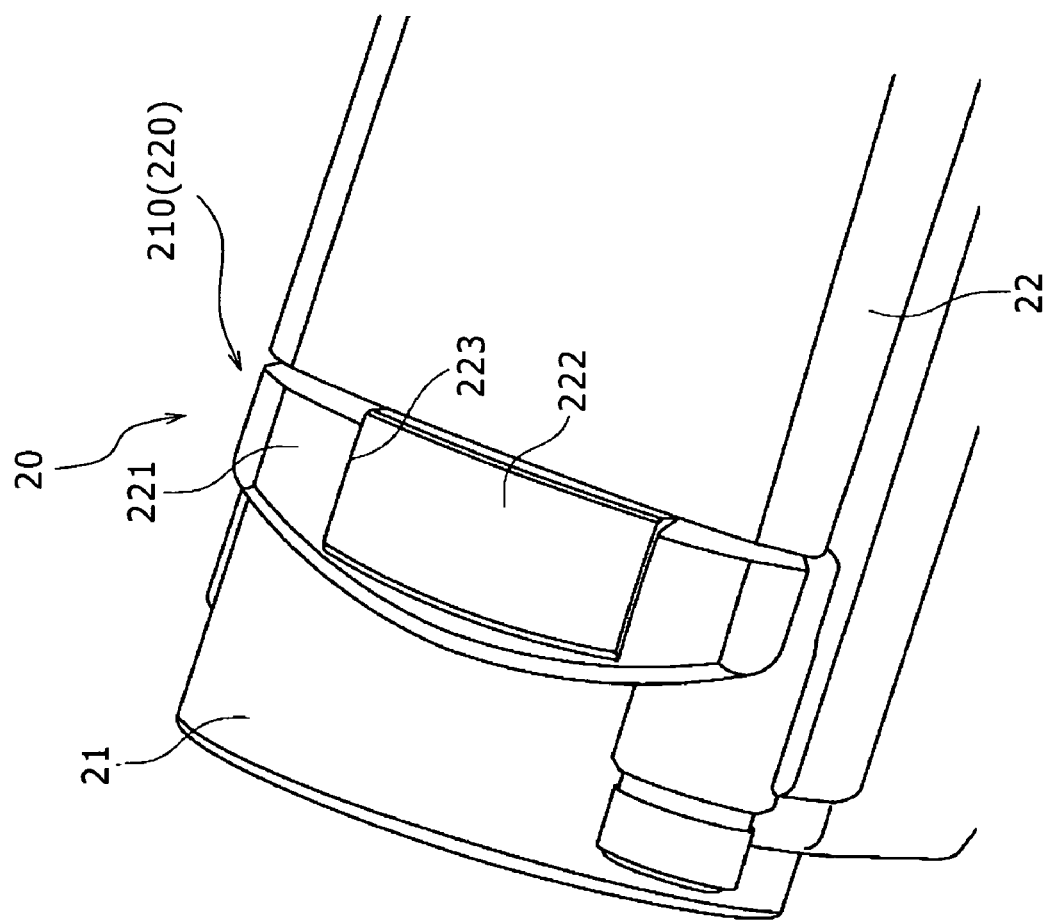

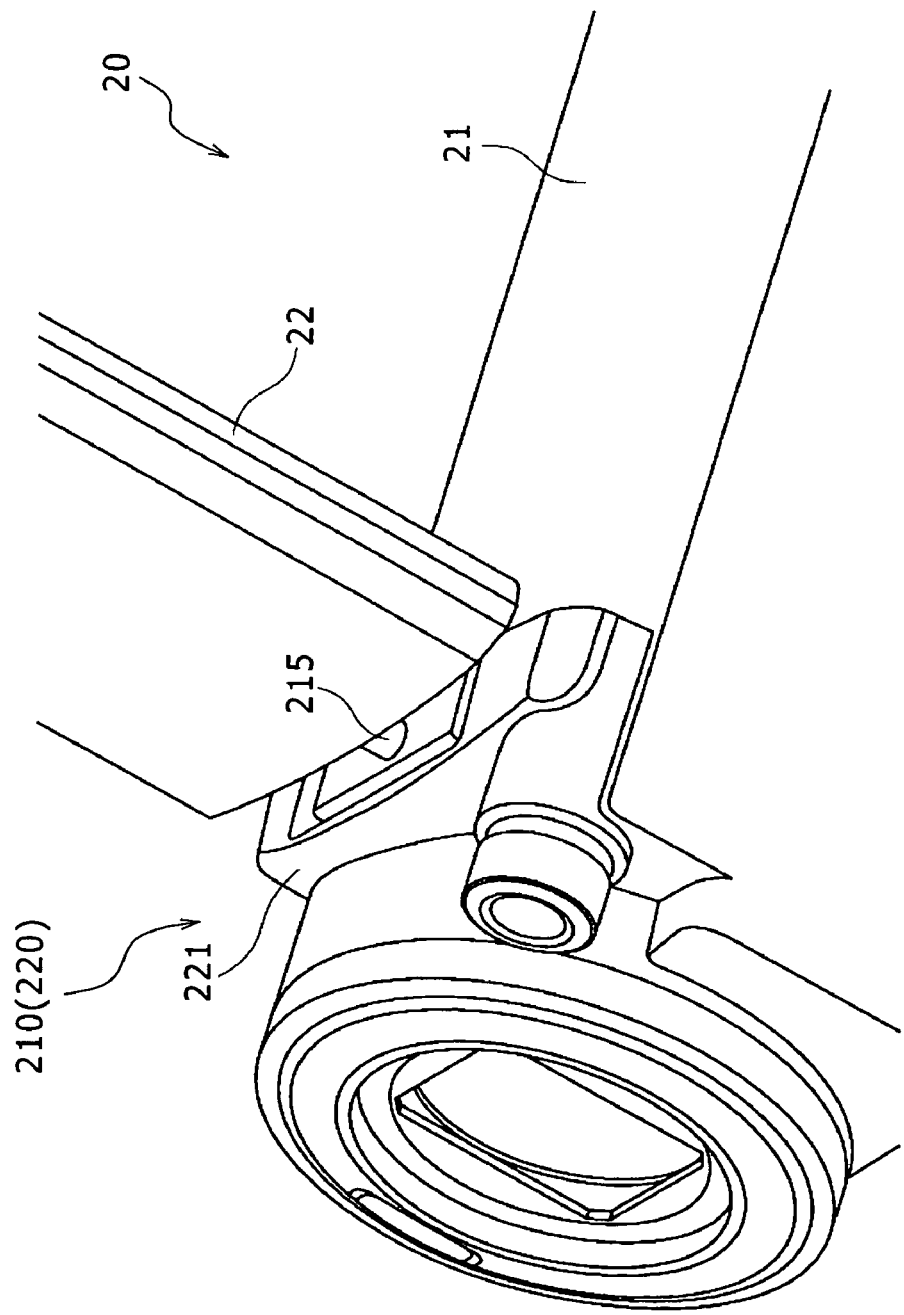

BIAXIAL HINGE MECHANISM AND ELECTRONIC APPARATUS

BACKGROUND OF THE INVENTION

1. Field of the Invention

The present invention relates to a biaxial hinge mechanism including an opening/closing shaft and a rotating shaft provided in a direction orthogonal to the opening/closing shaft, and to an electronic apparatus.

2. Description of the Related Art

In general, electronic apparatuses such as video cameras, digital cameras, cell phones, notebook-sized personal computers, etc. each often have an apparatus body in which electronic parts are mounted and a liquid crystal panel which displays pictures and characters. In each of these apparatuses, the liquid crystal panel can be opened and closed (be unfolded and folded) relative to the apparatus body, and the liquid crystal panel can be rotated when in the opened state. Between the apparatus body and the liquid crystal panel, therefore, there is provided a biaxial hinge mechanism which includes an opening/closing shaft and a rotating shaft provided in a direction orthogonal to the opening/closing shaft.

FIG. 17 is a perspective view showing a biaxial hinge mechanism 210 according to a related art.

FIG. 18 is a perspective view showing a condition in which the biaxial hinge mechanism 210 according to the related art shown in FIG. 17 is applied to a video camera 20.

FIG. 19 is a plan view showing a condition in which the biaxial hinge mechanism 210 according to the related art shown in FIG. 17 is applied to the video camera 20.

As shown in FIG. 17, the biaxial hinge mechanism 210 according to the related art includes an opening/closing shaft 212 supported between a pair of left and right opening/closing support sections 211a and 211b, and a rotating shaft 215 which is supported on the opening/closing shaft 212 and is provided in a direction orthogonal to the opening/closing shaft 212. In addition, the biaxial hinge mechanism 210 has a rotating support section 216 which is supported on the rotating shaft 215 and is provided to be rotatable relative to the opening/closing shaft 212, with the rotating shaft 215 as a center axis of rotation.

The biaxial hinge mechanism 210 in the related art as above is mounted, for example, to a video camera 20, as shown in FIGS. 18 and 19. Specifically, opening/closing support sections 211a and 211b are fixed to the outside of an apparatus body 21 of the video camera 20, and a liquid crystal panel 22 is secured to the rotating support section 216 (see FIG. 17). Therefore, the liquid crystal panel 22 can be opened and closed relative to the apparatus body 21, as indicated by arrows, with the opening/closing shaft 212 as a center axis of rotation. Besides, when the liquid crystal panel 22 has been turned (opened) away from the apparatus body 21, the liquid crystal panel 22 can be rotated relative to the apparatus body 21, as indicated by arrows, with the rotating shaft 215 as a center axis of rotation.

SUMMARY OF THE INVENTION

Even in the technology disclosed in Japanese Patent Laid-Open No. 2009-55636, there arises no problem in regard of the opening/closing and rotating functions of the liquid crystal panel 22.

However, the biaxial hinge mechanism 210 according to the related art as shown in FIGS. 17 to 19 has problems in that the aesthetic appearance of the video camera 20 may be damaged by the biaxial hinge mechanism 210, failure rate may be increased, the biaxial hinge mechanism 210 may have an increased number of component parts, component parts may be damaged, and so on.

FIG. 20 is a perspective view showing a condition in which the liquid crystal panel 22 is closed, in the video camera 20 having the biaxial hinge mechanism 210 according to the related art shown in FIG. 17.

FIG. 21 is a perspective view showing a condition in which the liquid crystal panel 22 is opened, in the video camera 20.

As shown in FIGS. 20 and 21, taking the aesthetic appearance of the video camera 20 into consideration, the apparatus body 21 of the video camera 20 is provided with an outer cover 220 for hiding the inside of the biaxial hinge mechanism 210. The outer cover 220 includes a body-side cover 221 provided to be secured to the apparatus body 21, and a panel-side cover 222 (omitted in FIG. 21, for convenience of description) which is opened and closed together with the liquid crystal panel 22.

The outer cover 220 is thus divided into the body-side cover 221 and the panel-side cover 222 (see FIG. 20) in order to ensure that when the liquid crystal panel 22 is opened, the rotating shaft 215 (see FIG. 21) would not interfere therewith. Specifically, when the liquid crystal panel 22 is turned away from the apparatus body 21, as shown in FIG. 21, the rotating shaft 215 becomes located on the inner side of the body-side cover 221. Therefore, the body-side cover 221 is so shaped as to be opened in the vicinity of the rotating shaft 215, for the purpose of avoiding interference with the rotating shaft 215. In addition, for concealing the rotating shaft 215, the panel-side cover 222 is provided which is opened and closed together with the liquid crystal panel 22.

Since the body-side cover 221 and the panel-side cover 222 are split from each other, however, split lines 223 as shown in FIG. 20 would be generated in the outer cover 220. The split lines 223 impair the beauty of the outer cover 220; specifically, the inside can be seen through the gaps between the body-side cover 221 and the panel-side cover 222, whereby the aesthetic quality of the video camera 20 would be lowered. In addition, intrusion of foreign matter through the gaps would increase failure rate of the video camera 20, and the splitting of the outer cover 220 leads to an increase in the number of component parts (leads to the need for the body-side cover 221 and the panel-side cover 222). Furthermore, since the panel-side cover 222 is a movable part which is opened and closed together with the liquid crystal panel 22, it may easily come into contact with the body-side cover 221, depending on the use conditions. Such a contact may damage the panel-side cover 222, may worsen the feeling of operation, or may cause generation of a foreign sound.

Thus, there is a need for an improvement of aesthetic appearance at an opening/closing section of an electronic apparatus such as a video camera.

According to an embodiment of the present invention, there is provided a biaxial hinge mechanism including: an opening/closing support section projected toward an outer side of a casing; an opening/closing shaft supported on the opening/closing support section; an outer cover provided to be fixed to the casing so as to hide the opening/closing support section and the opening/closing shaft; a hinge base supported on the opening/closing shaft so as to be rotatable relative to the casing, with the opening/closing shaft as a center axis of rotation; a rotation-restricting section operable to restrict a rotation angle of the hinge base to within a predetermined range; a rotating shaft supported on the hinge base and provided in a direction orthogonal to the opening/closing shaft; and a rotating support section supported on the rotating shaft so as to be rotatable relative to the hinge base, with the rotating shaft as a center axis of rotation, wherein the hinge base is so shaped that when the rotating support section is rotated away from the casing, the hinge base does not interfere with the outer cover in the range of the rotation angle restricted by the rotation-restricting section, and the rotating shaft is located on an outer side of the outer cover.

According to another embodiment of the present invention, there is provided an electronic apparatus including: a casing with electronic parts disposed in the inside thereof; an opening/closing support section projected toward an outer side of a casing; an opening/closing shaft supported on the opening/closing support section; an outer cover provided to be fixed to the casing so as to hide the opening/closing support section and the opening/closing shaft; a hinge base supported on the opening/closing shaft so as to be rotatable relative to the casing, with the opening/closing shaft as a center axis of rotation; a rotation-restricting section operable to restrict a rotation angle of the hinge base to within a predetermined range; a rotating shaft supported on the hinge base and provided in a direction orthogonal to the opening/closing shaft; a rotating support section supported on the rotating shaft so as to be rotatable relative to the hinge base, with the rotating shaft as a center axis of rotation; and an opening/closing body provided to be fixed to the rotating support section, wherein the hinge base is so shaped that when the opening/closing body is rotated away from the casing, the hinge base does not interfere with the outer cover in the range of the rotation angle restricted by the rotation-restricting section, and the rotating shaft is located on an outer side of the outer cover.

(Operation)

In the embodiments of the present invention as above, the biaxial hinge mechanism has the opening/closing shaft supported on the opening/closing support section of the casing, and the rotating shaft provided in a direction orthogonal to the opening/closing shaft. The rotating shaft is borne on the hinge base which is provided to be rotatable relative to the casing, with the opening/closing shaft as a center axis of rotation. In addition, the hinge base is formed in such a shape that the hinge base does not interfere with the outer cover which is provided to hide the opening/closing support section and the opening/closing shaft and that the rotating shaft is located on the outside of the outer cover. Therefore, the biaxial hinge mechanism can be made to function, without dividing the outer cover into a portion on the casing side and a portion on the rotating shaft side.

Thus, according to the embodiments of the present invention as above-mentioned, it is unnecessary to divide the outer cover into a portion on the casing side and a portion on the rotating shaft side. Therefore, the aesthetic appearance of the outer cover in the biaxial hinge mechanism can be enhanced. Accordingly, when the biaxial hinge mechanism is provided in an electronic apparatus such as a video camera, it is possible to provide a high-quality electronic apparatus which is excellent in design properties and the like.

BRIEF DESCRIPTION OF THE DRAWINGS

FIG. 19 is a plan view showing the condition in which the biaxial hinge mechanism according to the related art shown in FIG. 17 is applied to the video camera;

FIG. 20 is a perspective view showing a video camera having the biaxial hinge mechanism according to the related art shown in FIG. 17, in a state in which a liquid crystal display is closed; and FIG. 21 is a perspective view showing the video camera having the biaxial hinge mechanism according to the related art shown in FIG. 17, in a state in which the liquid crystal panel is opened.

DETAILED DESCRIPTION OF THE PREFERRED EMBODIMENTS

Figure 1:
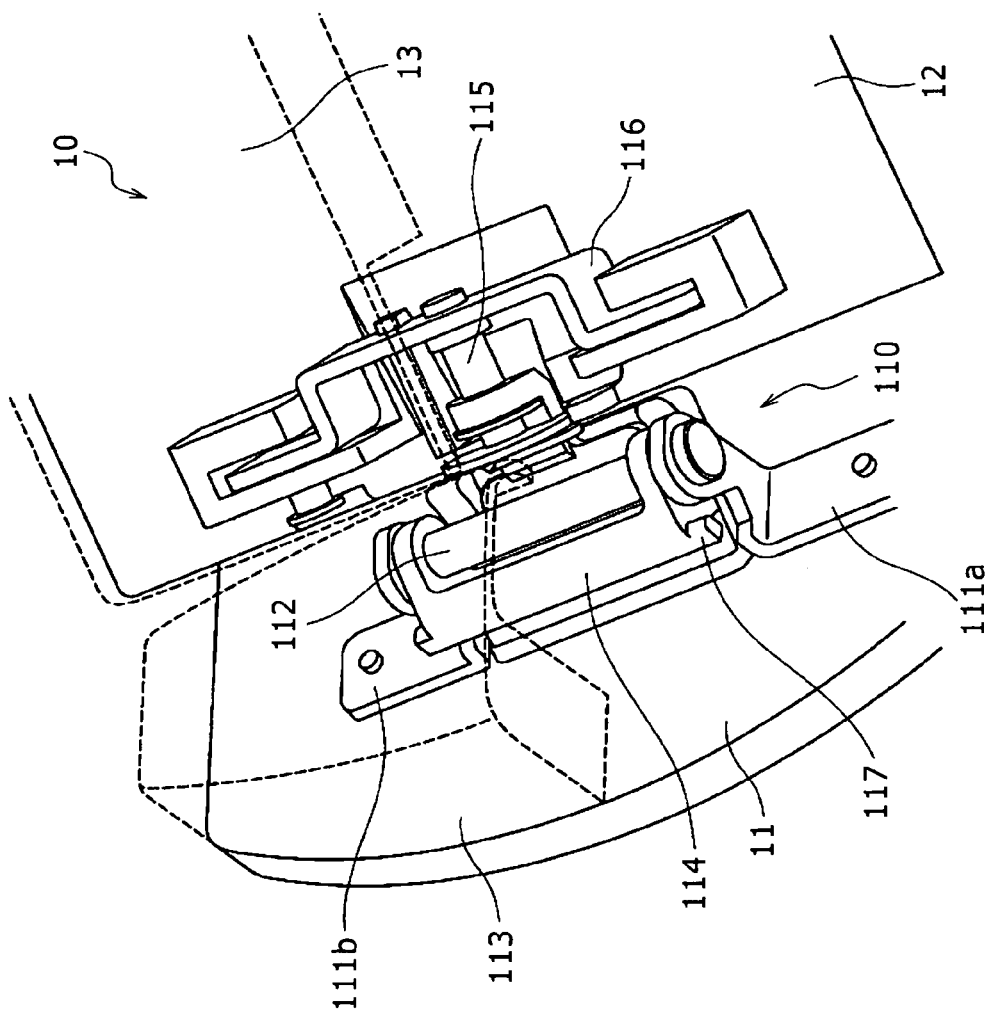
FIG. 1 is a perspective view showing a biaxial hinge mechanism for a video camera, as a first embodiment of a biaxial hinge mechanism according to one embodiment of the present invention.

Now, referring to the drawings, some embodiments of the present invention will be described below.

Here, an electronic apparatus in the following embodiments of the present invention is assumed to be a video camera 10. In addition, a biaxial hinge mechanism in the following embodiments of the present invention is assumed to be a biaxial hinge mechanism 110, 120 for a video camera 10.

Incidentally, the description will be made in the following order.

1. First Embodiment (Biaxial hinge mechanism: a configuration example designed to be opened and closed within a range of 0 to 90°)

2. Second Embodiment (Biaxial hinge mechanism: a configuration example designed to be opened and closed within a range of 0 to 180°)

1. First Embodiment

[Configuration Example of Biaxial Hinge Mechanism (Opened and Closed Within a Range of 0 to 90°)]

FIG. 1 is a perspective view of a biaxial hinge mechanism 110 for a video camera 10, as a first embodiment of the biaxial hinge mechanism according to one embodiment of the present invention.

As shown in FIG. 1, the biaxial hinge mechanism 110 in the first embodiment includes a pair of left and right opening/closing support sections 111a and 111b projected toward the outside of an apparatus body 11 (corresponding to a casing in an embodiment of the present invention) of the video camera 10, and an opening/closing shaft 112 supported between the two opening/closing support sections 111a and 111b. Besides, an outer cover 113 for hiding the opening/closing support sections 111a and 111b as well as the opening/closing shaft 112 is provided to be fixed to the apparatus body 11.

Incidentally, in FIG. 1, only one half of the outer cover 113 is indicated in broken lines, in order that the configuration in the inside of the outer cover 113 can be seen in a perspective manner.

In addition, a hinge base 114 is supported on the opening/closing shaft 112. The hinge base 114 is provided to be rotatable (to be opened/closed, or unfolded/folded) relative to the apparatus body 11, with the opening/closing shaft 112 as a center axis of rotation. Here, for rendering the hinge base 114 thus rotatable, there may be adopted a configuration in which the hinge base 114 can be rotated relative to the opening/closing shaft 112 or a configuration in which the opening/closing shaft 112 can be rotated relative to the opening/closing support sections 111a and 111b.

Incidentally, the hinge base 114 is provided with rotation-restricting sections 117 which abut on the opening/closing support sections 111a, 111b when the rotation angle of the hinge base 114 reaches 90°.

Further, on the hinge base 114 is supported a rotating shaft 115 which is provided in a direction orthogonal to the opening/closing shaft 112. Besides, on the rotating shaft 115 is supported a rotating support section 116, which is provided to be rotatable relative to the hinge base 114 with the rotating shaft 115 as a center axis of rotation. Here, for making the rotating support section 116 thus rotatable, there may be adopted a configuration in which the rotating support section 116 can be rotated relative to the rotating shaft 115 or a configuration in which the rotating shaft 115 can be rotated relative to the hinge base 114.

Furthermore, a liquid crystal panel 12 (corresponding to a part of an opening/closing body in an embodiment of the present invention) is provided to be secured to the rotating support section 116. In addition, the apparatus body 11 with electronic parts mounted therein and the liquid crystal panel 12 are electrically interconnected through a flexible wiring (not shown) which is wound around the rotating shaft 115.

Here, the rotating shaft 115 and the rotating support section 116 are disposed between (in the inside of) the liquid crystal panel 12 and a panel cover 13 (corresponding to a part of the opening/closing body in an embodiment of the present invention). This ensures that the rotating shaft 115 and the rotating support section 116 are hidden by the liquid crystal panel 12 and the panel cover 13. As a result, the need to provide an exclusive-use cover in the area of the rotating shaft 115 and the rotating support section 116 is eliminated, whereby an increase in the number of component parts can be obviated.

Incidentally, in FIG. 1, only one half of the panel cover 13 is indicated by broken lines, in order that the configuration in the inside of the panel cover 13 can be seen in a perspective manner.

On the other hand, the structure on the side of the opening/closing support sections 111a and 111b as well as the opening/closing shaft 112 is hidden by the outer cover 113 of the biaxial hinge mechanism 110. In this case, the structure of division of the outer cover into the body-side cover 221 and the panel-side cover 222 as in the case of the outer cover 220 according to the related art shown in FIG. 20 is not adopted for the outer cover 113 in this embodiment. Therefore, an increase in the number of component parts can be avoided, and the absence of the split lines 223 (which have been present in the configuration according to the related art) promises enhanced beauty of the outer cover 113, in the biaxial hinge mechanism 110 according to this embodiment shown in FIG. 1.

Figure 2:
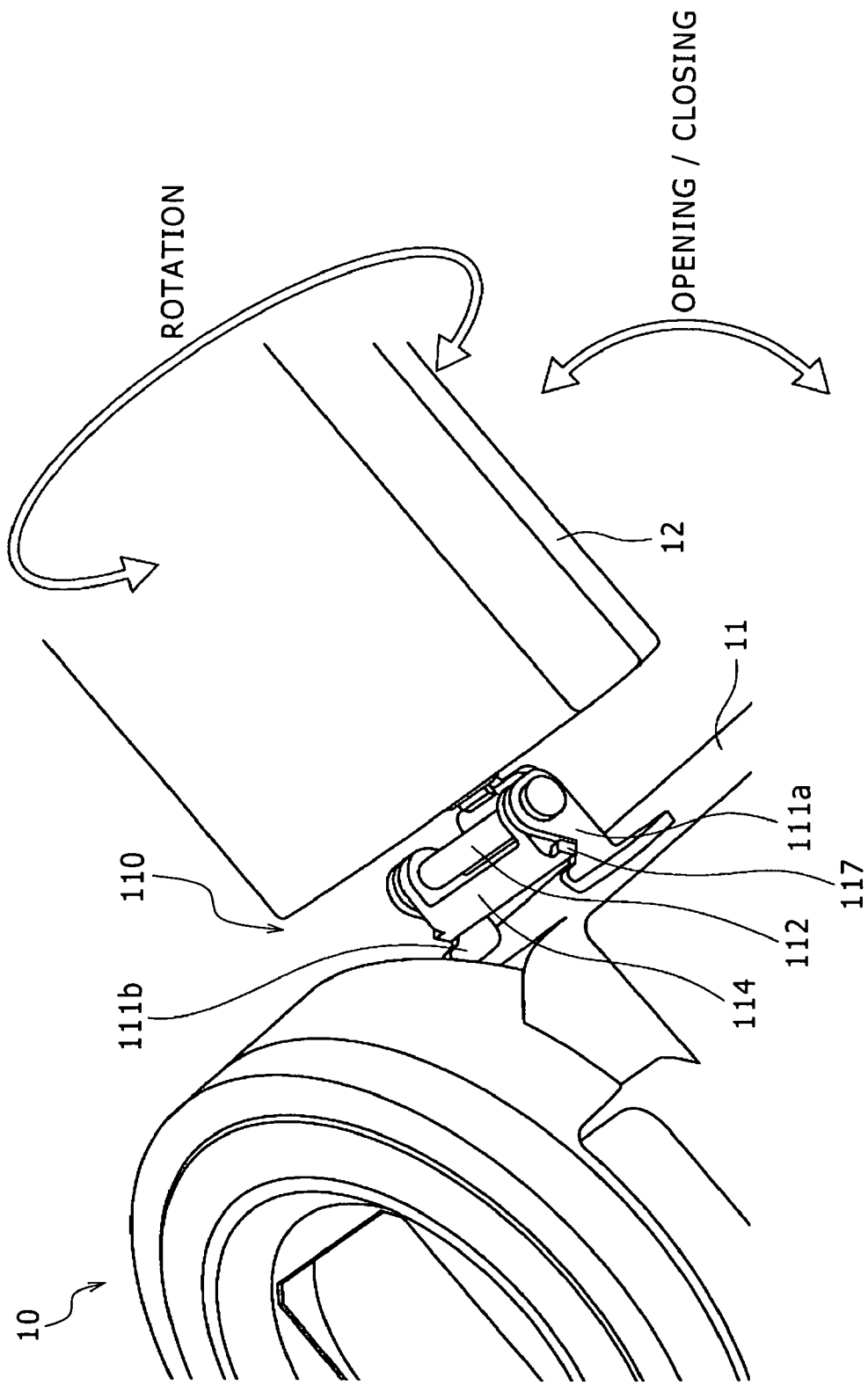
FIG. 2 is a perspective view showing a condition in which the biaxial hinge mechanism in the first embodiment shown in FIG. 1 is applied to a video camera.

FIG. 2 is a perspective view showing a condition in which the biaxial hinge mechanism 110 in the first embodiment shown in FIG. 1 is applied to a video camera 10.

Figure 3:
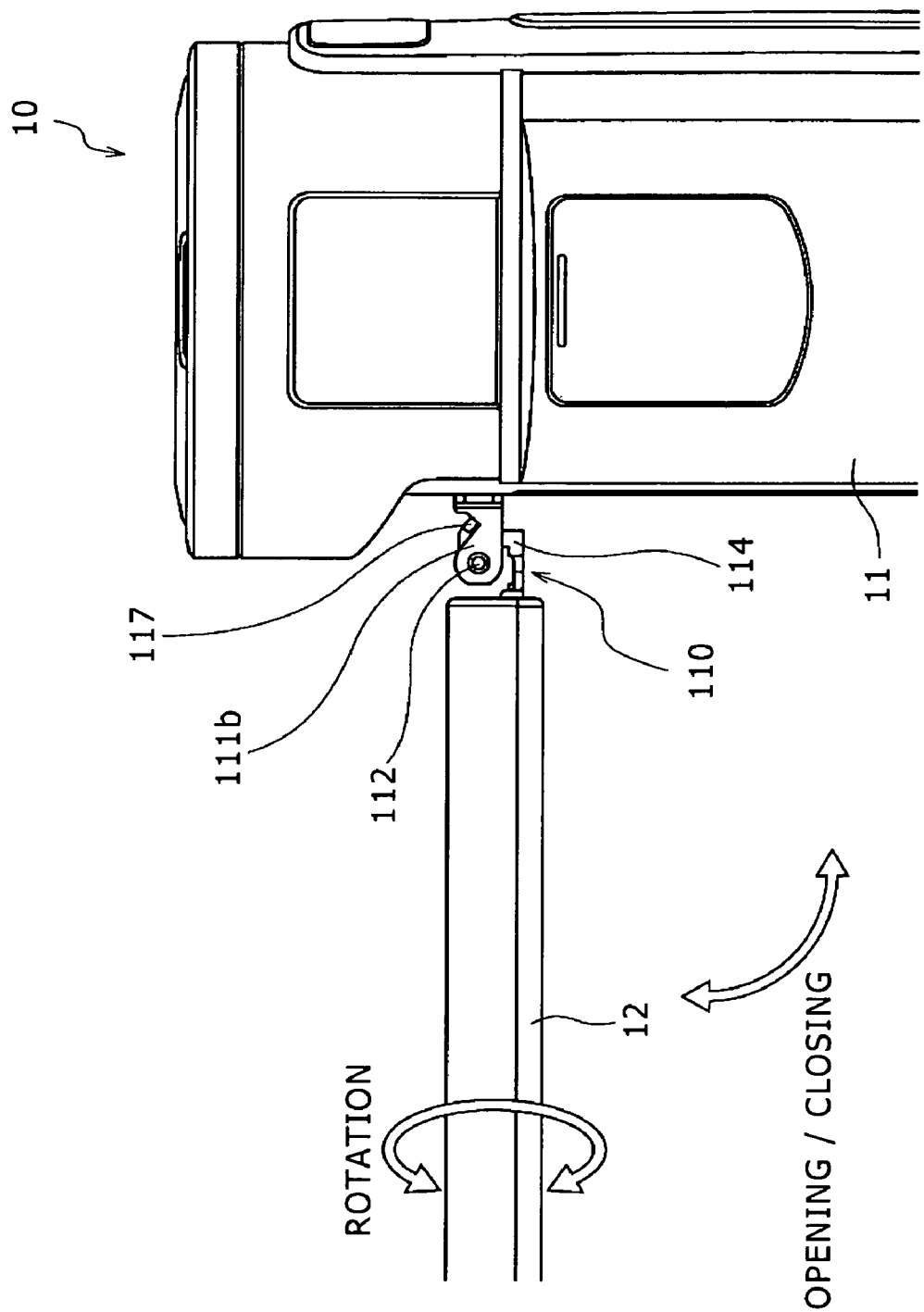
FIG. 3 is a plan view showing the condition in which the biaxial hinge mechanism in the first embodiment shown in FIG. 1 is applied to the video camera.

FIG. 3 is a plan view showing the condition in which the biaxial hinge mechanism 110 in the first embodiment shown in FIG. 1 is applied to the video camera 10.

In FIGS. 2 and 3, the outer cover 113 (see FIG. 1) is omitted, for convenience of description of the inside structure of the biaxial hinge mechanism 110.

As shown in FIGS. 2 and 3, the biaxial hinge mechanism 110 in the first embodiment is mounted to the video camera 10. Specifically, the opening/closing support sections 111a and 111b are secured to the outside of the apparatus body 11 of the video camera 10, and the opening/closing shaft 112 is supported on the opening/closing support sections 111a and 111b. In addition, the hinge base 114 is supported on the opening/closing shaft 112, and the rotating shaft 115 (see FIG. 1) is borne on the hinge base 114. Further, the rotating support section 116 (see FIG. 1) is supported on the rotating shaft 115, and the liquid crystal panel 12 is secured to the rotating support section 116.

As a result, the liquid crystal panel 12 can be opened and closed (unfolded and folded) relative to the apparatus body 11, as indicated by arrows, with the opening/closing shaft 112 as a center axis of rotation for opening/closing. Here, as the liquid crystal panel 12 is progressively opened, the rotation-restricting sections 117 provided in the hinge base 114 come into abutment on the opening/closing support sections 111a and 111b, respectively. In other words, in the biaxial hinge mechanism 110 in the first embodiment, the rotation angle of the hinge base 114 is restricted to within a predetermined range (0 to 90°) by the rotation-restricting sections 117. Accordingly, the liquid crystal panel 12 can be opened only to 90° (to the state shown in FIGS. 2 and 3).

In addition, when the liquid crystal panel 12 has been rotated away from the apparatus body 11, the liquid crystal panel 12 is rotatable relative to the apparatus body 11, as indicated by arrows, with the rotating shaft 115 (see FIG. 1) as a center axis of rotation. In this condition, therefore, the operator of the video camera 10 can shoot, with the angle of the liquid crystal panel 12 adjusted to such a direction that the liquid crystal panel 12 is easy for the operator to see.

Figure 4:
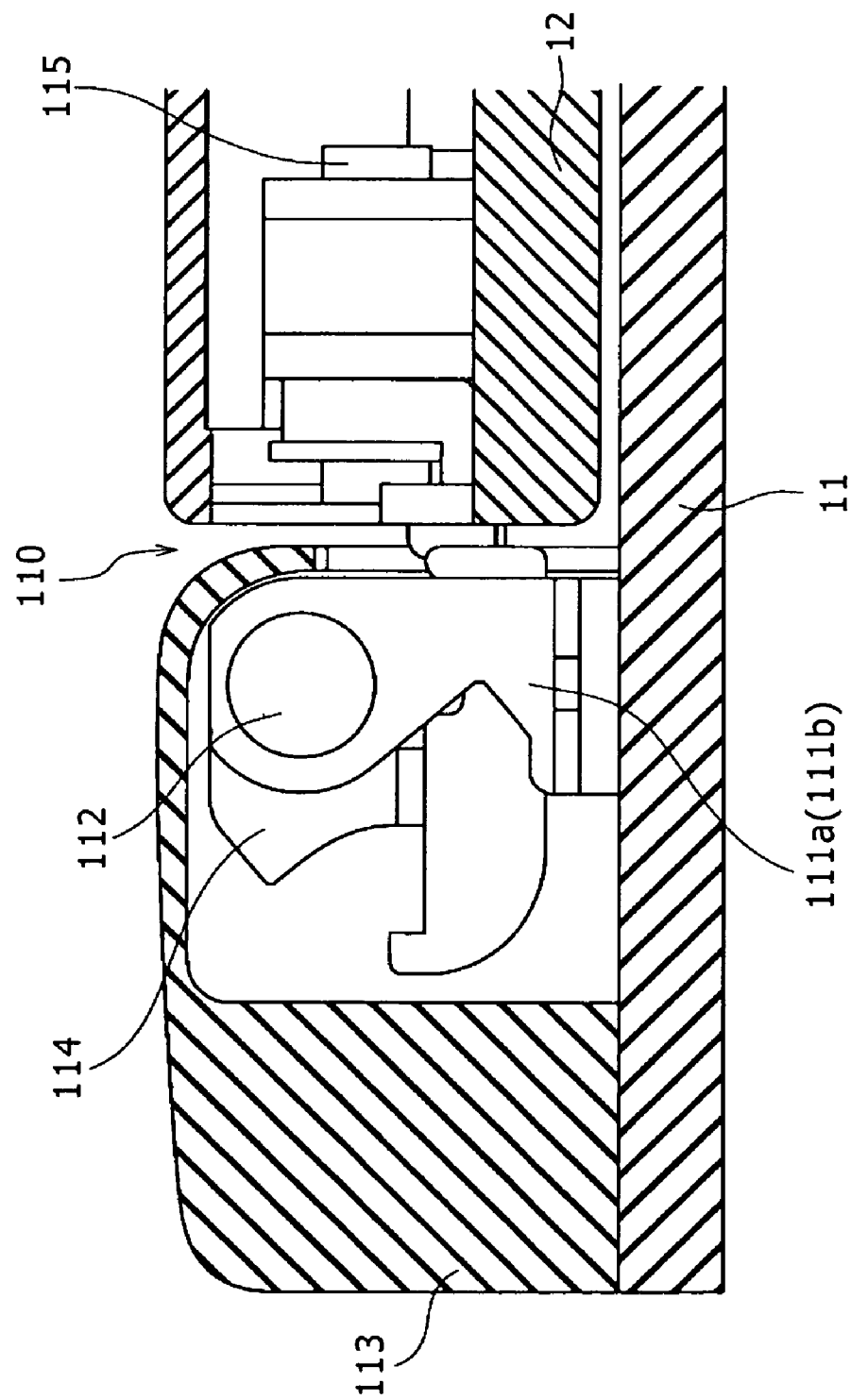
FIG. 4 is a side view showing a normal closed state of the biaxial hinge mechanism for the video camera, as the first embodiment of a biaxial hinge mechanism according to the one embodiment of the present invention.

FIG. 4 is a side view showing a normal closed state of the biaxial hinge mechanism 110 for the video camera 10, as the first embodiment of the biaxial hinge mechanism according to an embodiment of the present invention.

Figure 5:
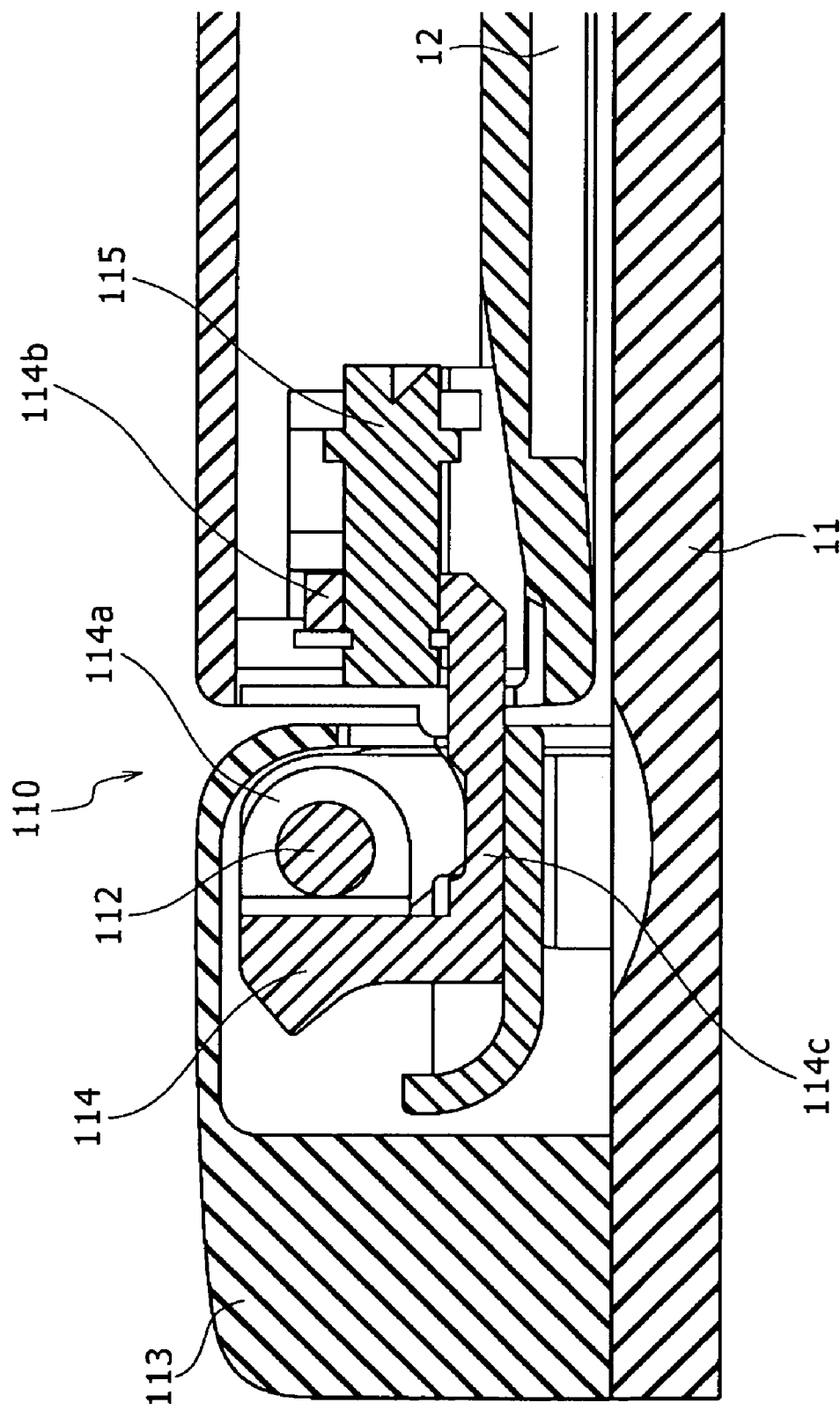
FIG. 5 is a sectional view showing the normal closed state of the biaxial hinge mechanism for the video camera, as the first embodiment of the biaxial hinge mechanism according to the one embodiment of the present invention.

FIG. 5 is a sectional view showing the normal closed state of the biaxial hinge mechanism 110 for the video camera 10, as the first embodiment of the biaxial hinge mechanism according to an embodiment of the present invention.

Figure 6:
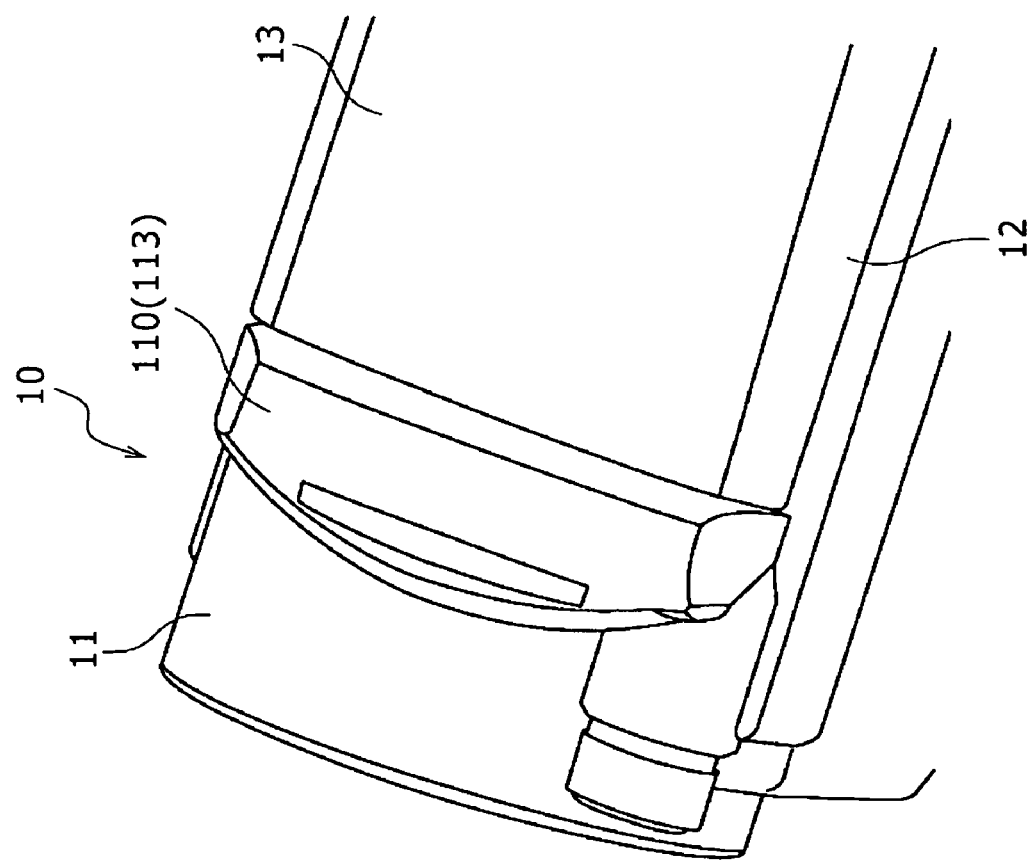
FIG. 6 is a perspective view showing a video camera having the biaxial hinge mechanism in the first embodiment of the biaxial hinge mechanism according to the one embodiment of the present invention, in a state in which a liquid crystal panel is closed.

FIG. 6 is a perspective view showing a video camera 10 having the biaxial hinge mechanism 110 according to the first embodiment shown in FIGS. 4 and 5, in a state in which a liquid crystal panel 12 is closed (folded).

Incidentally, for convenience of description, the outer cover 113, the apparatus body 11 and the liquid crystal panel 12 shown in FIGS. 4 and 5 are presented in section.

As shown in FIGS. 4 and 5, a normal closed state of the biaxial hinge mechanism 110 is a state in which the liquid crystal panel 12 is set to face the apparatus body 11. As shown in FIG. 6, therefore, the external appearance of the video camera 10 is composed of the outer cover 113 and the panel cover 13. Here, the outer cover 113 is provided to be secured to the apparatus body 11, and the opening/closing support sections 111a (111b) and the opening/closing shaft 112 and the like shown in FIG. 4 are hidden by the single outer cover 113 alone. Therefore, the split lines 223 as in the case of the outer cover 220 according to the related art shown in FIG. 20 are absent in this embodiment, and, accordingly, the video camera 10 is of high quality, with the aesthetic appearance of the outer cover 113 being excellent.

Thus, the biaxial hinge mechanism 110 according to the first embodiment ensures that the opening/closing shaft 112 and the like in the inside thereof can be hidden by the single, non-split outer cover 113. In addition, the hinge base 114 supported on the opening/closing shaft 112 so as to be rotatable relative to the apparatus body 11, with the opening/closing shaft 112 as a center axis of rotation, is so shaped as not to interfere with the outer cover 113. Besides, the hinge base 114 is formed in such a shape that the rotating shaft 115 of the liquid crystal panel 12 is located on the outside of the outer cover 113.

Specifically, as shown in FIG. 5, the hinge base 114 includes an opening/closing shaft insertion section 114a in which to insert the opening/closing shaft 112, a rotating shaft insertion section 114b in which to insert the rotating shaft 115, and a base section 114c roughly U-shaped in section as viewed along the axial direction of the opening/closing shaft 112. The opening/closing shaft insertion section 114a is projected from one end side of the roughly U-shaped form of the base section 114c toward the inside of the base section 114c, whereas the rotating shaft insertion section 114b is provided on the other end side of the roughly U-shaped form of the base section 114c. Therefore, even when the liquid crystal panel 12 is opened, interference with the outer cover 113 can be obviated by the presence of (or owing to the shape of) the base section 114c.

Figure 7:
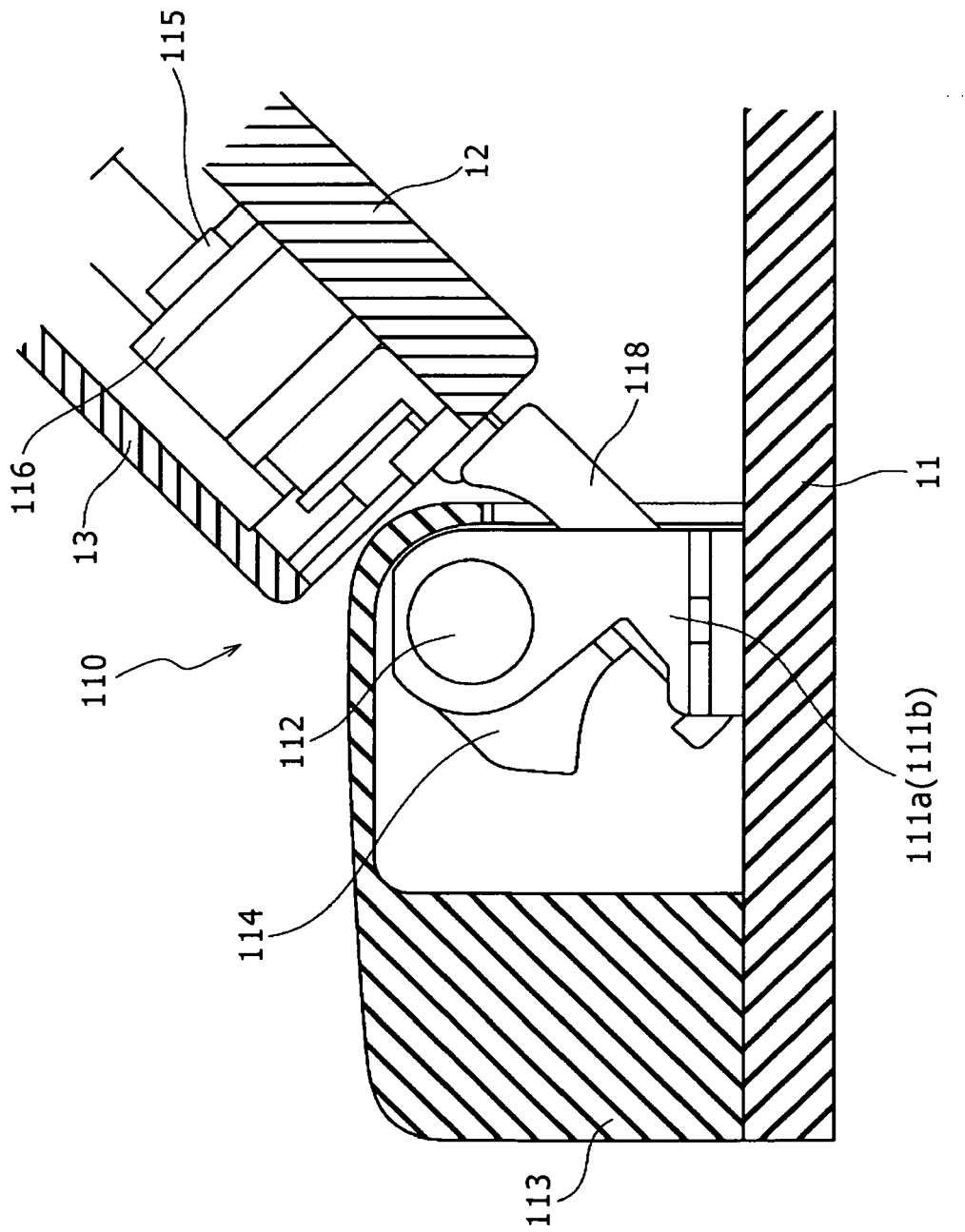
FIG. 7 is a side view showing a half-opened state of the biaxial hinge mechanism for the video camera, as the first embodiment of the biaxial hinge mechanism according to the one embodiment of the present invention.

FIG. 7 is a side view showing a half-opened state of the biaxial hinge mechanism 110 for the video camera 10, as the first embodiment of the biaxial hinge mechanism according to an embodiment of the present invention.

Figure 8:
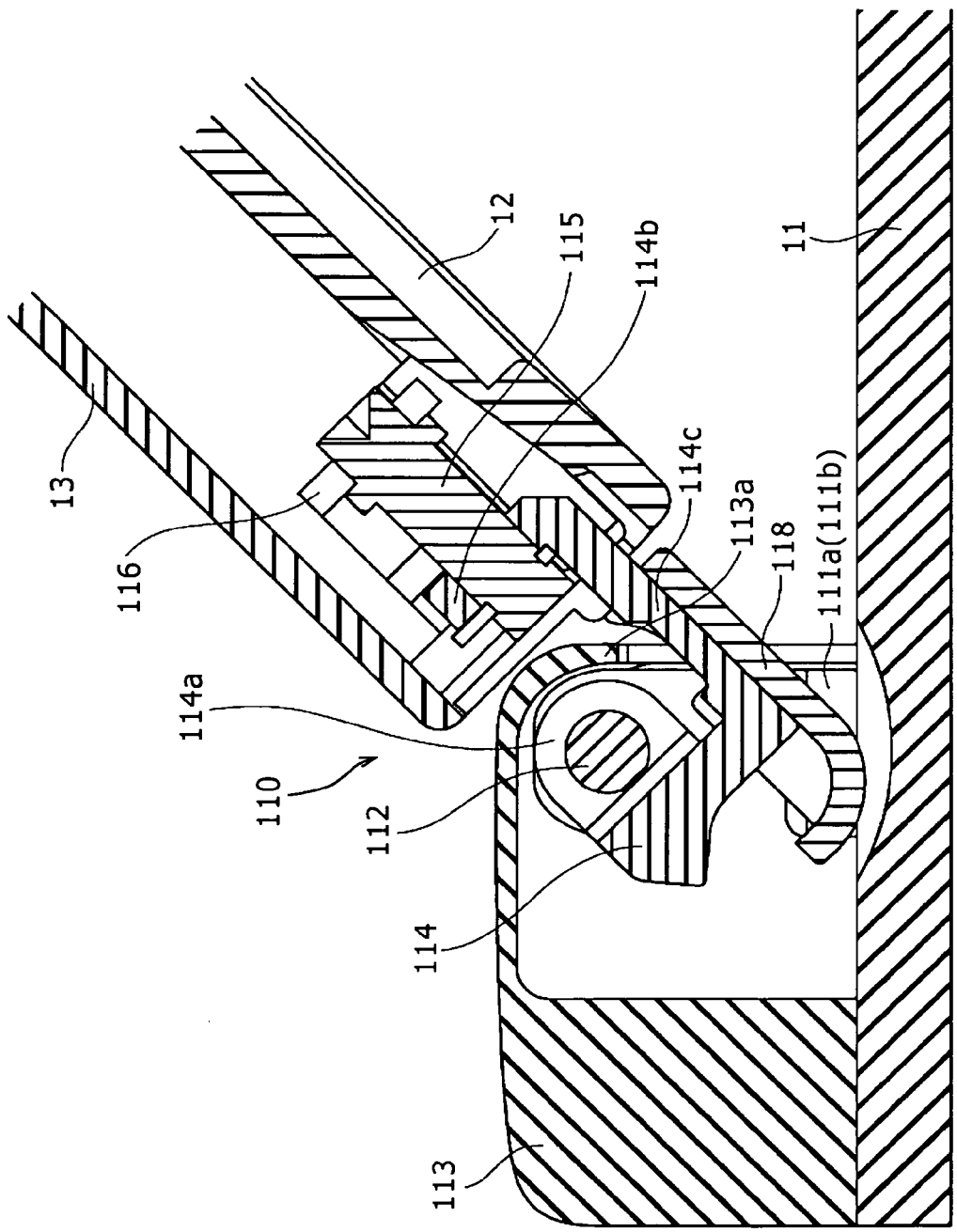
FIG. 8 is a sectional view showing the half-opened state of the biaxial hinge mechanism for the video camera, as the first embodiment of the biaxial hinge mechanism according to the one embodiment of the present invention.

FIG. 8 is a sectional view showing the half-opened state of the biaxial hinge mechanism 110 for the video camera 10, as the first embodiment of the biaxial hinge mechanism according to an embodiment of the present invention.

Figure 9:
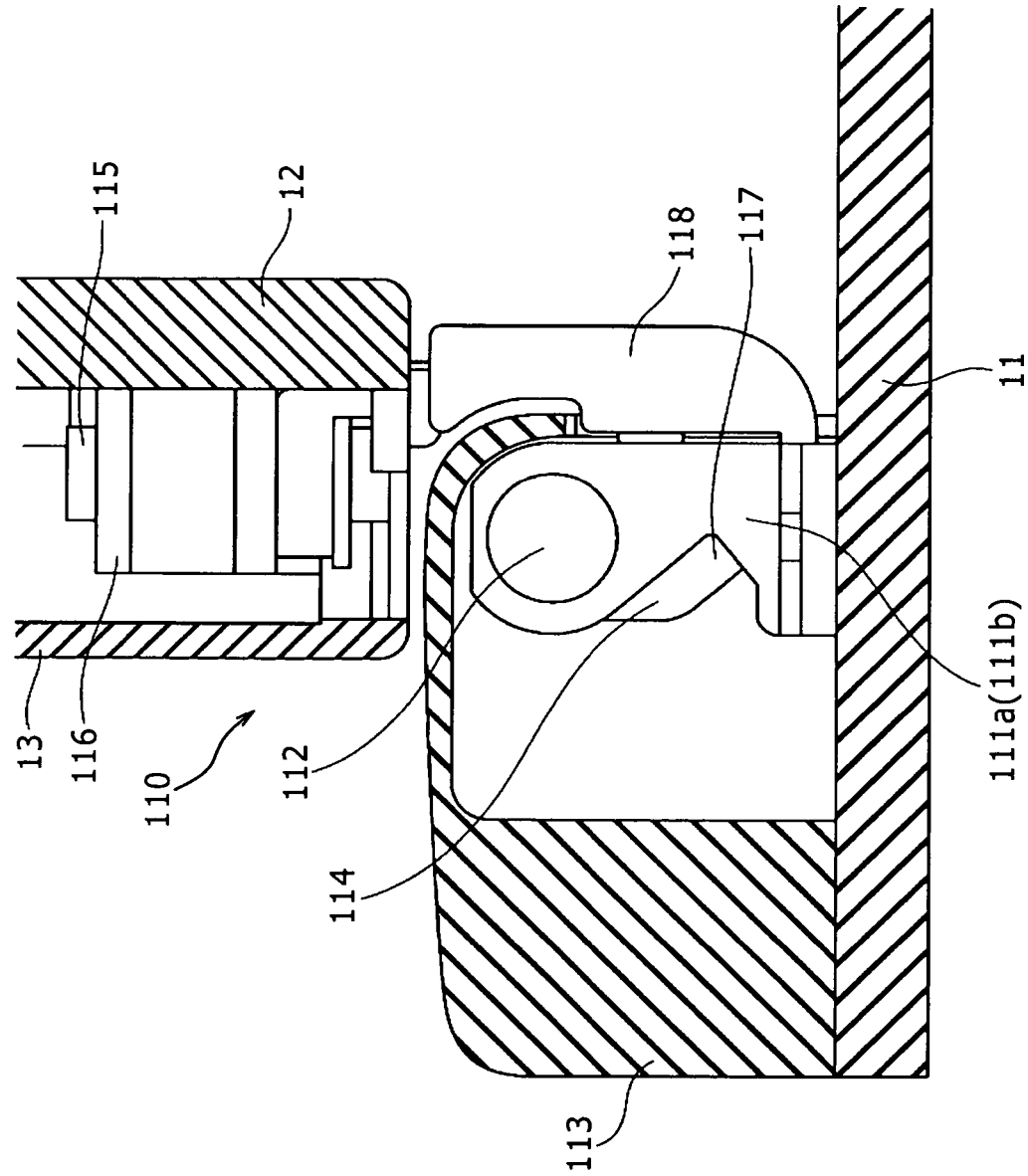
FIG. 9 is a side view showing a fully opened state of the biaxial hinge mechanism for the video camera, as the first embodiment of the biaxial hinge mechanism according to the one embodiment of the present invention.

FIG. 9 is a side view showing a fully opened state of the biaxial hinge mechanism 110 for the video camera 10, as the first embodiment of the biaxial hinge mechanism according to an embodiment of the present invention.

Figure 10:
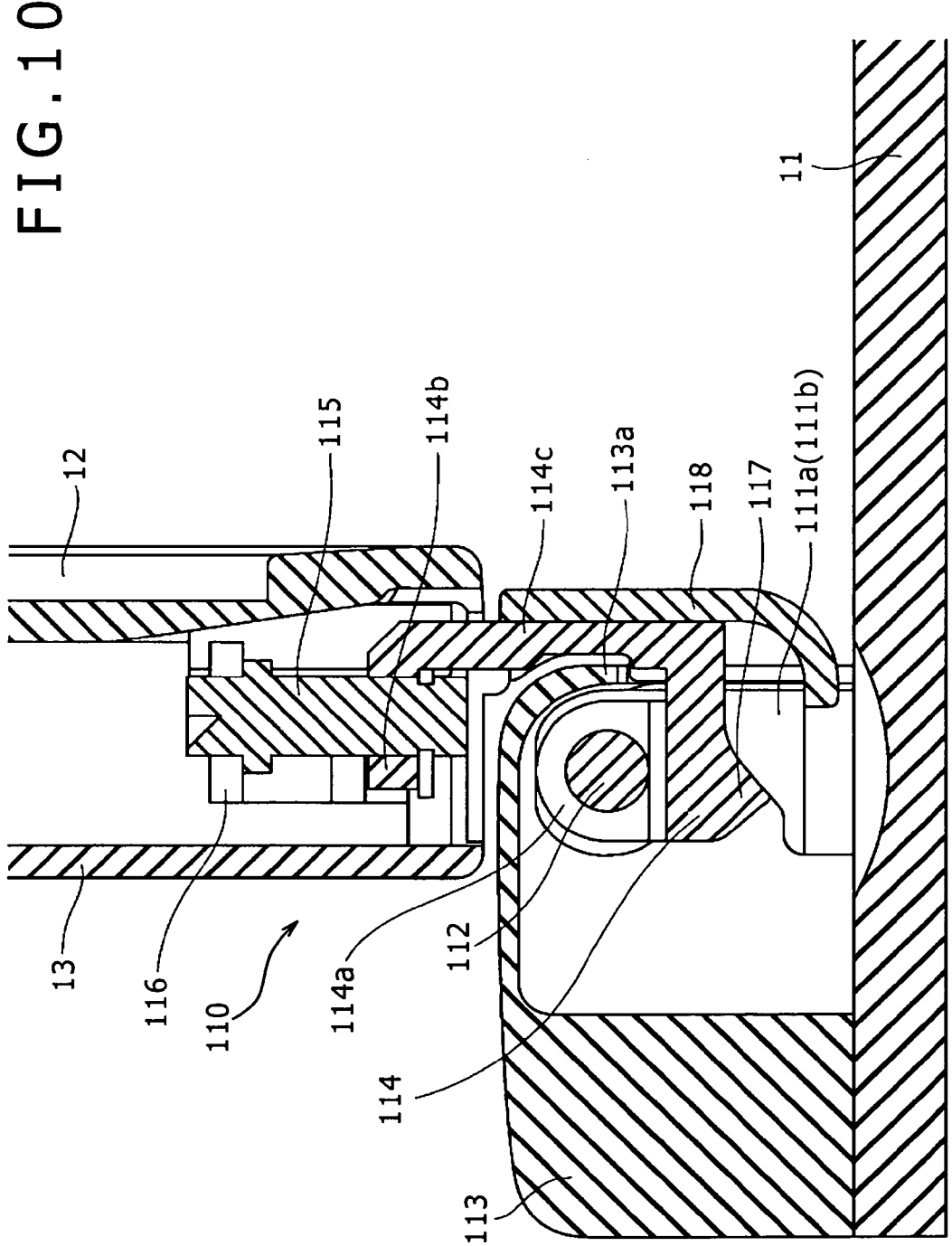
FIG. 10 is a sectional view showing the fully opened state of the biaxial hinge mechanism for the video camera, as the first embodiment of the biaxial hinge mechanism according to the one embodiment of the present invention.

FIG. 10 is a sectional view showing the fully opened state of the biaxial hinge mechanism 110 for the video camera 10, as the first embodiment of the biaxial hinge mechanism according to an embodiment of the present invention.

Incidentally, for convenience of description, the outer cover 113, the apparatus body 11, the liquid crystal panel 12, and the panel cover 13 shown in FIGS. 7 to 10 are presented in section.

A state in which the liquid crystal panel 12 is opened (unfolded) to an angle of 45°, as shown in FIGS. 7 and 8, is the half-opened state of the biaxial hinge mechanism 110. In addition, a state in which the liquid crystal panel 12 is opened to 90°, as shown in FIGS. 9 and 10, is the fully opened state of the biaxial hinge mechanism 110. As the liquid crystal panel 12 is progressively opened, the hinge base 114 is accordingly rotated with the opening/closing shaft 112 as a center axis of rotation, and the rotating support section 116 and the liquid crystal panel 12 provided to be secured to the rotating support section 116 are accordingly rotated away from the apparatus body 11.

Here, the shapes of the opening/closing shaft insertion section 114a, the rotating shaft insertion section 114b, and the base section 114c of the hinge base 114 shown in FIG. 8 ensure that a tip portion 113a of the outer cover 113 enters the roughly U-shaped form of the base section 114c. In other words, the hinge base 114 is provided with the roughly U-shaped base section 114c so as not to interfere with the outer cover 113. In addition, the opening/closing shaft insertion section 114a is projected from one end side of the roughly U-shaped form of the base section 114c toward the inside of the base section 114c, whereas the rotating shaft insertion section 114b is provided on the other end side of the roughly U-shaped form of the base section 114c.

Thus, even when the liquid crystal panel 12 is opened, the hinge base 114 would not interfere with the outer cover 113. Besides, as shown in FIGS. 4 to 10, the opening/closing support sections 111a (111b), the opening/closing shaft 112, and the opening/closing shaft insertion section 114a are always hidden by the outer cover 113. On the other hand, the rotating shaft insertion section 114b, the rotating shaft 115, and the rotating support section 116 are always hidden by the liquid crystal panel 12 and the panel cover 13, and are moved on the outside of the outer cover 113 as the liquid crystal panel 12 is opened.

In addition, when the liquid crystal panel 12 is opened, the base section 114c of the hinge base 114 also comes to be located on the outside of the outer cover 113. In this connection, an inner cover 118 is attached to the base section 114c. Therefore, the base section 114c is hidden by the inner cover 118. Accordingly, even when the liquid crystal panel 12 opened and closed, the inside of the biaxial hinge mechanism 110 is never exposed, so that aesthetic appearance is maintained.

Further, when the liquid crystal panel 12 is opened to 90°, as shown in FIGS. 9 and 10, the rotation-restricting sections 117 abut on the opening/closing sections 111a (111b). Consequently, the rotation angle of the hinge base 114 is restricted to within 90°, so that the liquid crystal panel 12 and the panel cover 13 would never interfere with the outer cover 113.

Furthermore, the liquid crystal panel 12 can, in its opened state, be rotated about the rotating shaft 115. In this case, even when the liquid crystal panel 12 is rotated, the hinge base 114 is not rotated, and, therefore, the hinge base 114 would not interfere with the outer cover 113.

Incidentally, electric wiring (not shown) such as a harness, a flexible wiring board, etc. between the apparatus body 11 (in which electronic parts are mounted) and the liquid crystal panel 12 is passed through the inside of the outer cover 113 and is wound around the rotating shaft 115. Therefore, at the times of opening/closing and rotation of the liquid crystal panel 12, no trouble is caused by the electric wiring.

Figure 11:
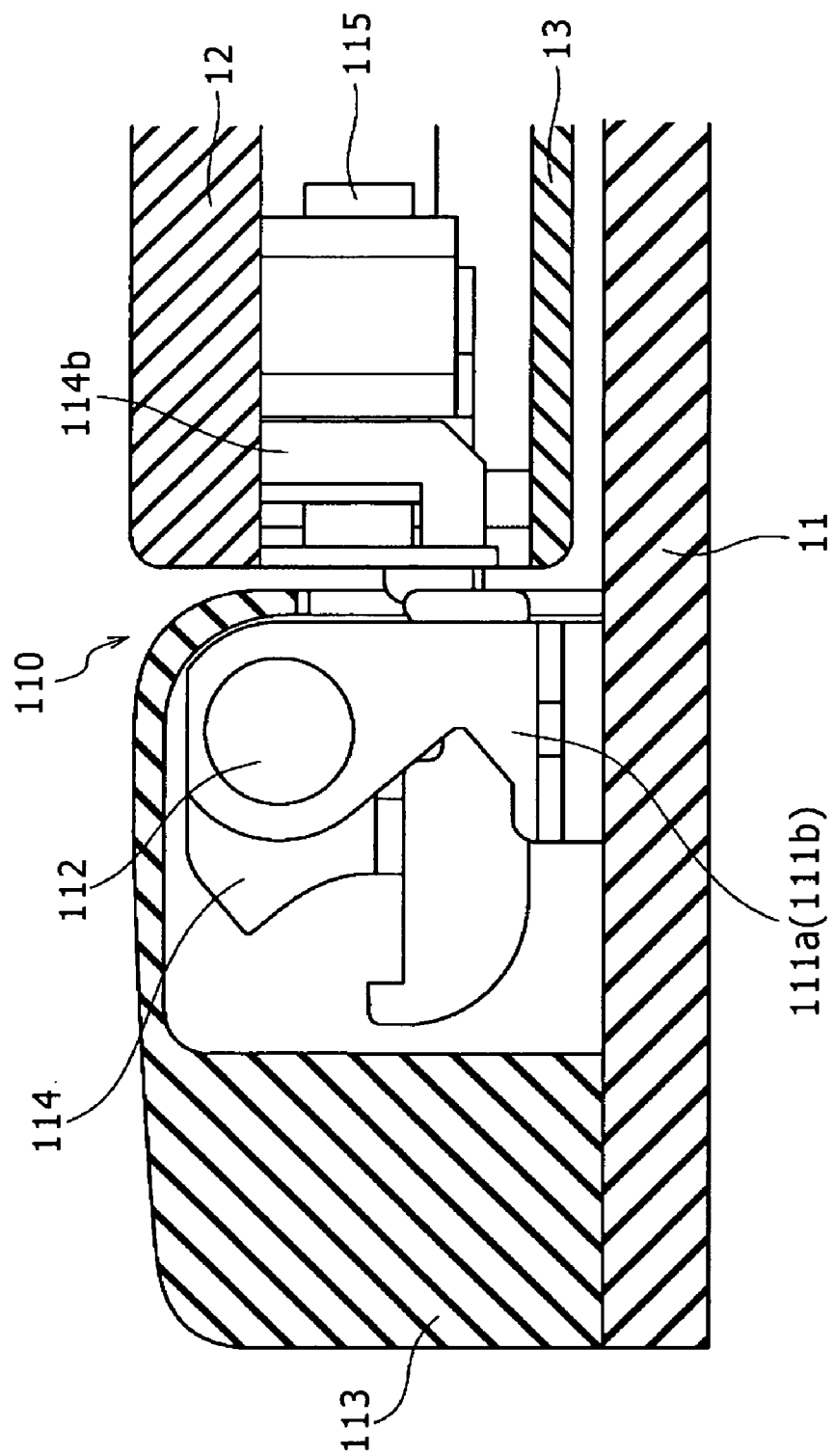
FIG. 11 is a side view showing a reverse closed state of the biaxial hinge mechanism for the video camera, as the first embodiment of the biaxial hinge mechanism according to the one embodiment of the present invention.

FIG. 11 is a side view showing a reverse closed state of the biaxial hinge mechanism 110 for the video camera 10, as the first embodiment of the biaxial hinge mechanism according to an embodiment of the present invention.

The reverse closed state shown in FIG. 11 is a state in which the positional relationship between the liquid crystal panel 12 and the panel cover 13 is reverse to that in the normal closed state shown in FIG. 4.

Specifically, in the fully opened state of the liquid crystal panel 12 shown in FIG. 10, the liquid crystal panel 12 is reversed by rotation about the rotating shaft 115. Thereafter, the liquid crystal panel 12 is closed. This results in the reverse closed state shown in FIG. 11. In the reverse closed state, the liquid crystal panel 12 is exposed to the side of the outer surface of the apparatus body 11. Consequently, shot pictures and the like can be displayed on the liquid crystal panel 12 to be viewed.

In addition, the rotating shaft 115 of the liquid crystal panel 12 is inserted in the rotating shaft insertion section 114b of the hinge base 114. In this case, the rotating shaft 115 is located in the vicinity of the center in the thickness direction of the liquid crystal panel 12 and the panel cover 13 (slightly on the outer side relative to the center in the thickness direction, as viewed from the apparatus body 11). Therefore, even upon switching between the normal closed state (see FIG. 4) and the reverse closed state (see FIG. 11), no step is generated between the outer cover 113 and the panel cover 13 or the liquid crystal panel 12.

2. Second Embodiment

[Configuration Example of Biaxial Hinge Mechanism (Opened and Closed Within a Range of 0 to 180°)]

Figure 12:
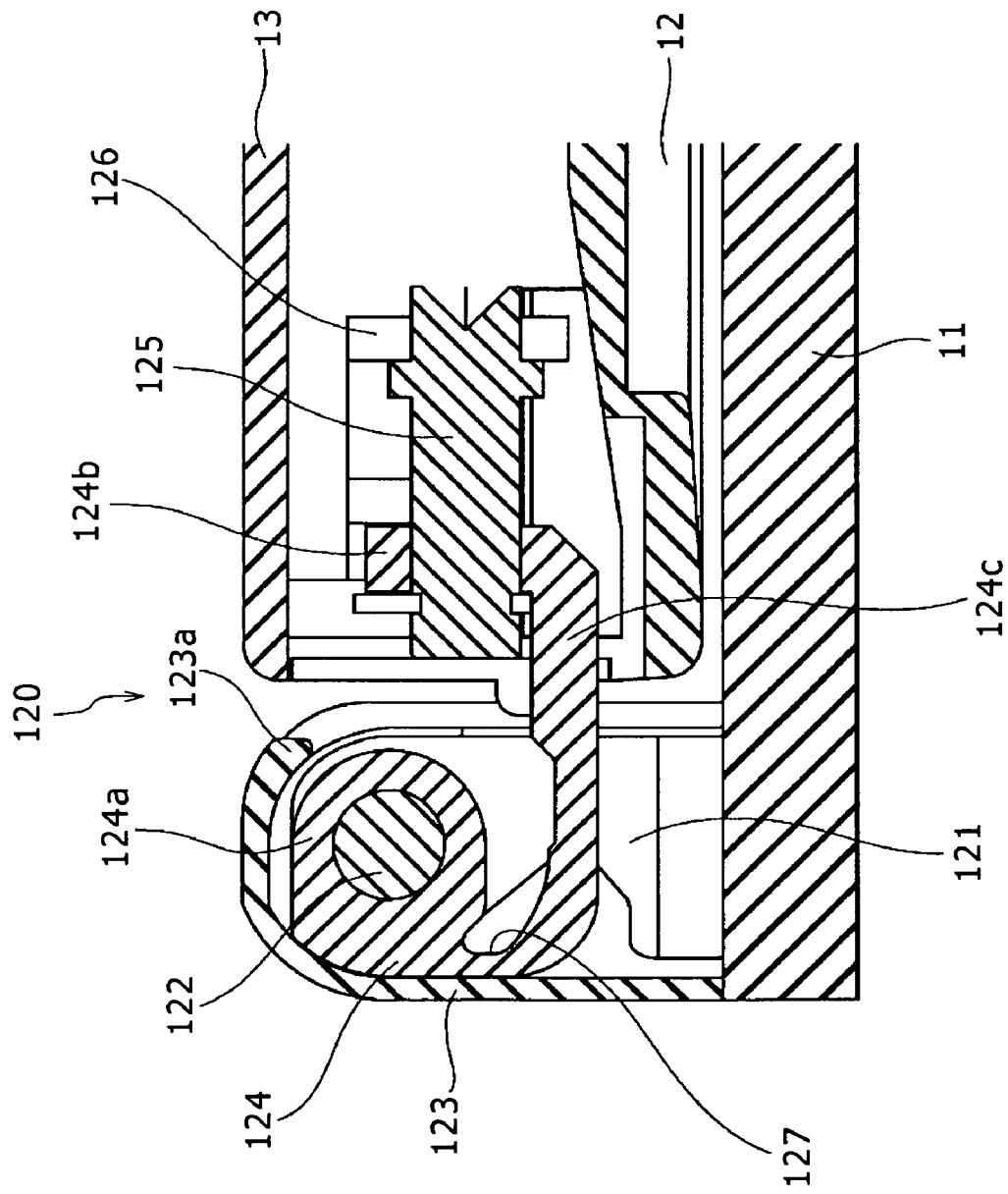
FIG. 12 is a sectional view showing a normal closed state of a biaxial hinge mechanism for a video camera, as a second embodiment of the biaxial hinge mechanism according to the one embodiment of the present invention.

FIG. 12 is a sectional view showing a normal closed state of a biaxial hinge mechanism 120 for a video camera 10, as a second embodiment of the biaxial hinge mechanism according to an embodiment of the present invention.

Figure 13:
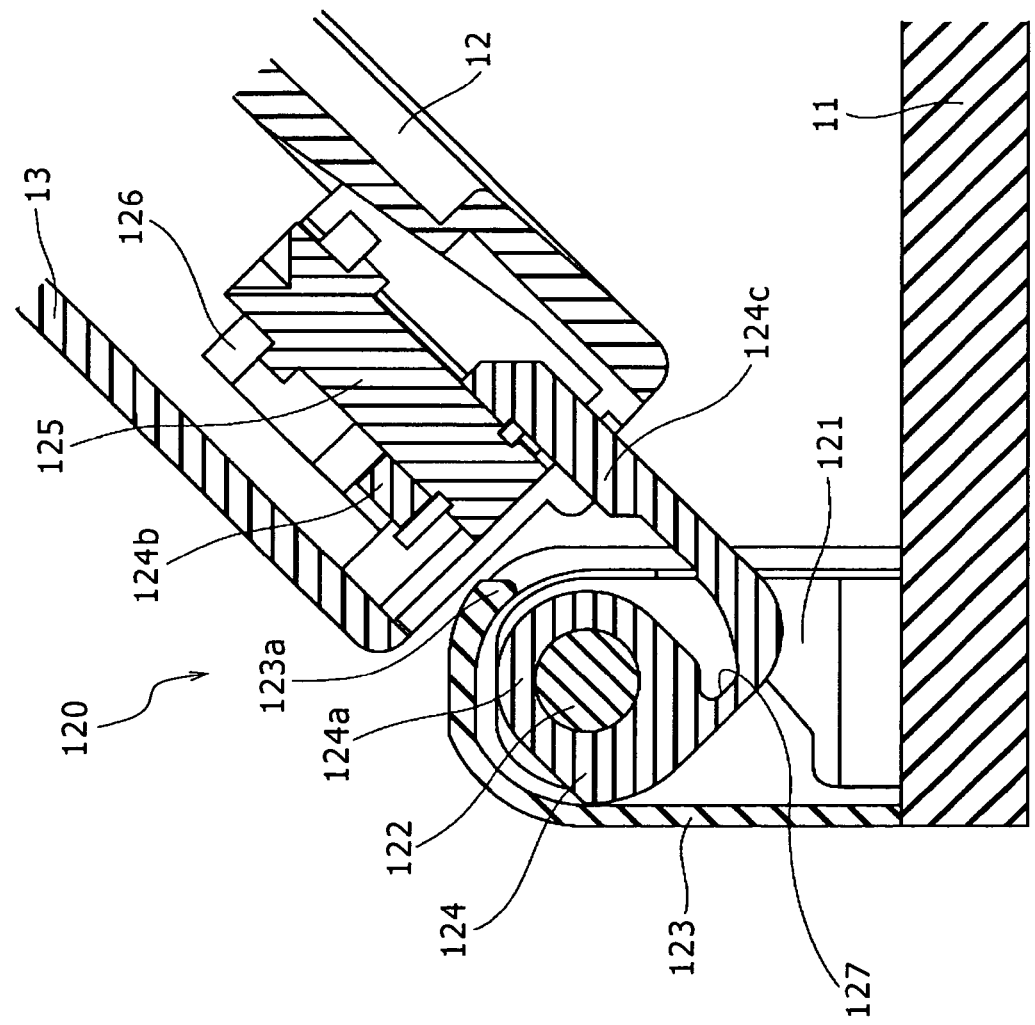
FIG. 13 is a sectional view showing a 45° opened state of the biaxial hinge mechanism for the video camera, as the second embodiment of the biaxial hinge mechanism according to the one embodiment of the present invention.

FIG. 13 is a sectional view showing a 45° opened state of the biaxial hinge mechanism 120 for the video camera 10, as the second embodiment of the biaxial hinge mechanism according to an embodiment of the present invention.

Figure 14:
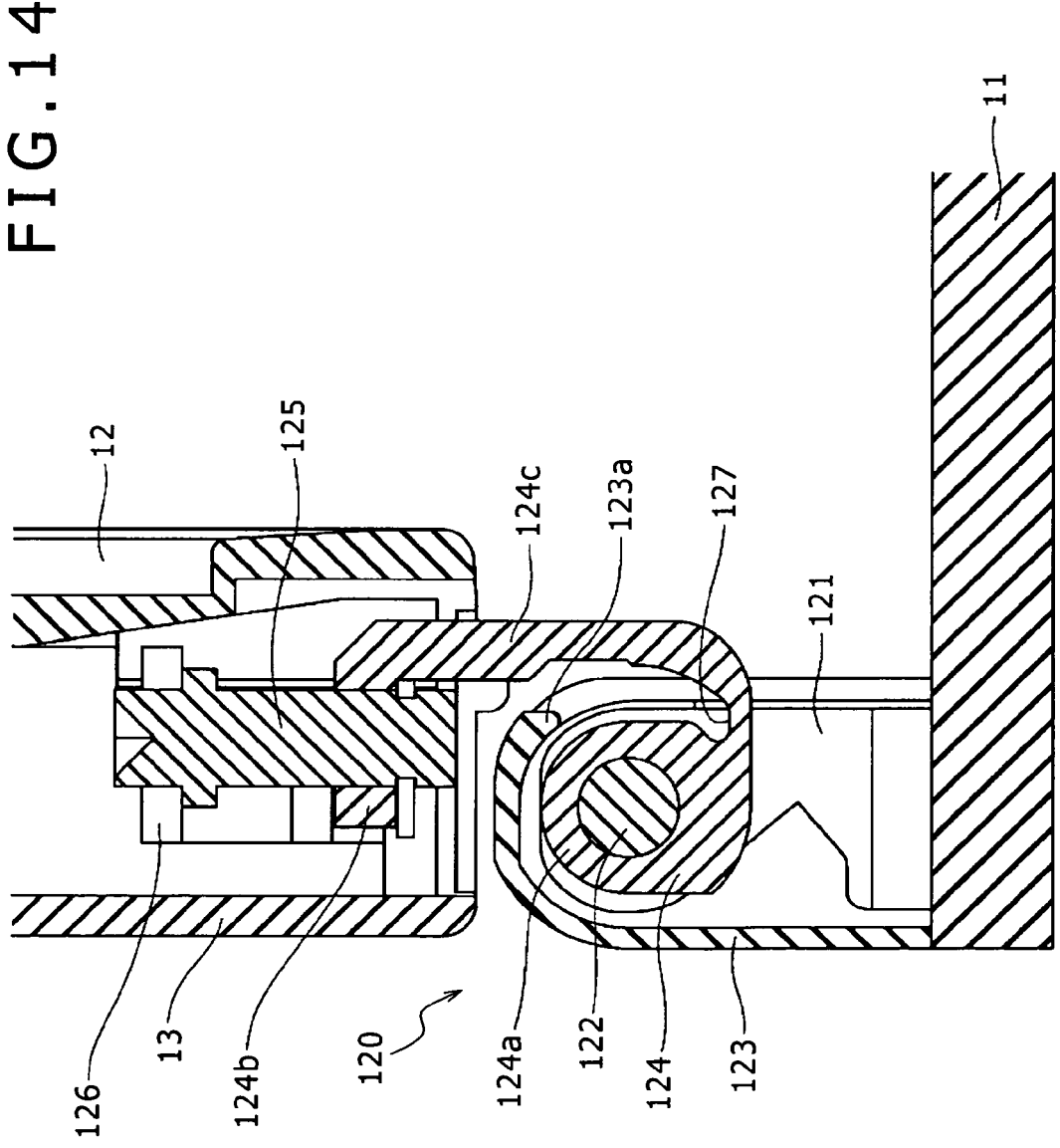
FIG. 14 is a sectional view showing a 90° opened state of the biaxial hinge mechanism for the video camera, as the second embodiment of the biaxial hinge mechanism according to the one embodiment of the present invention.

FIG. 14 is a sectional view showing a 90° opened state of the biaxial hinge mechanism 120 for the video camera 10, as the second embodiment of the biaxial hinge mechanism according to an embodiment of the present invention.

Figure 15:
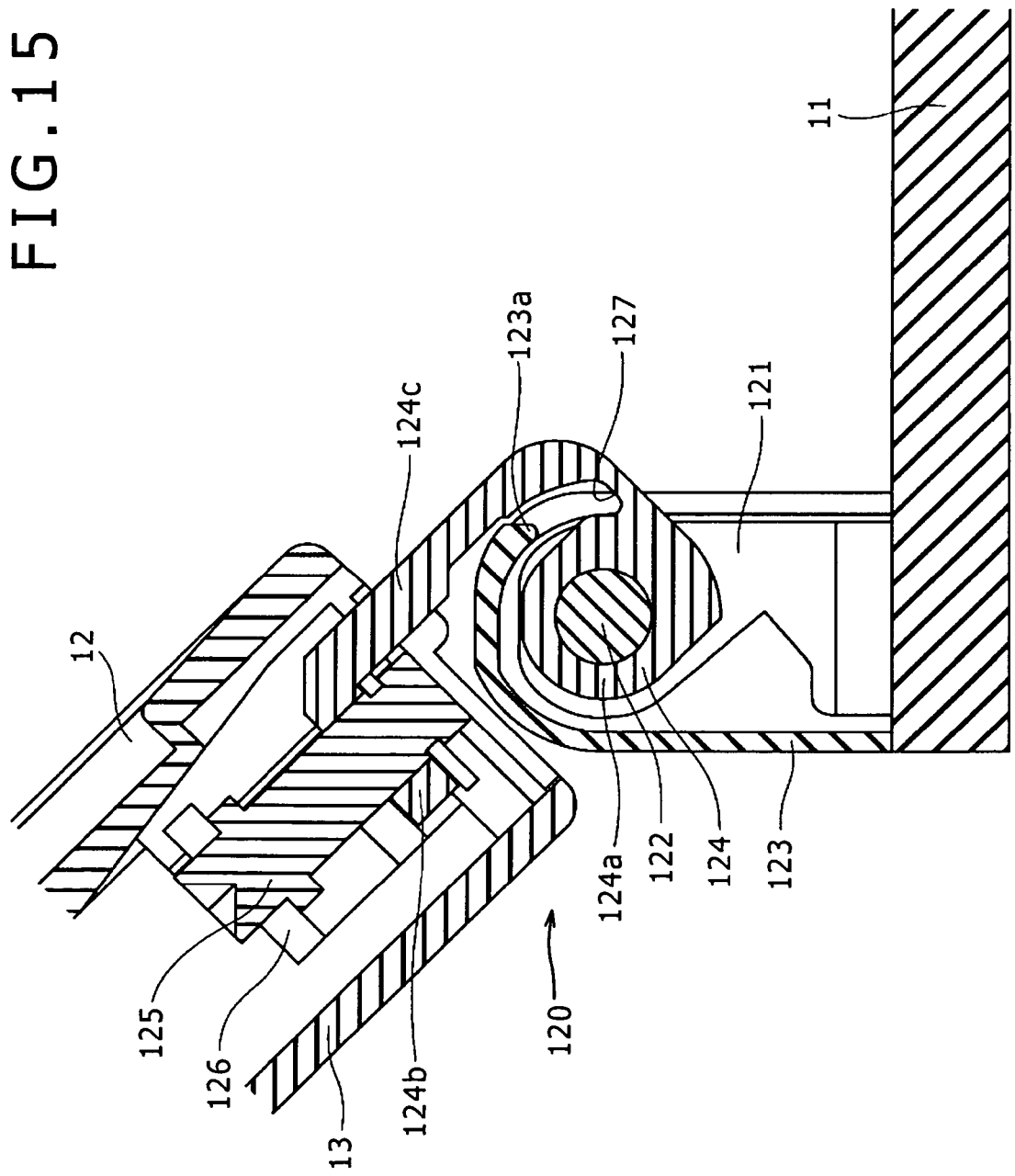
FIG. 15 is a sectional view showing a 135° opened state of the biaxial hinge mechanism for the video camera, as the second embodiment of the biaxial hinge mechanism according to the one embodiment of the present invention.

FIG. 15 is a sectional view showing a 135° opened state of the biaxial hinge mechanism 120 for the video camera 10, as the second embodiment of the biaxial hinge mechanism according to an embodiment of the present invention.

Figure 16:
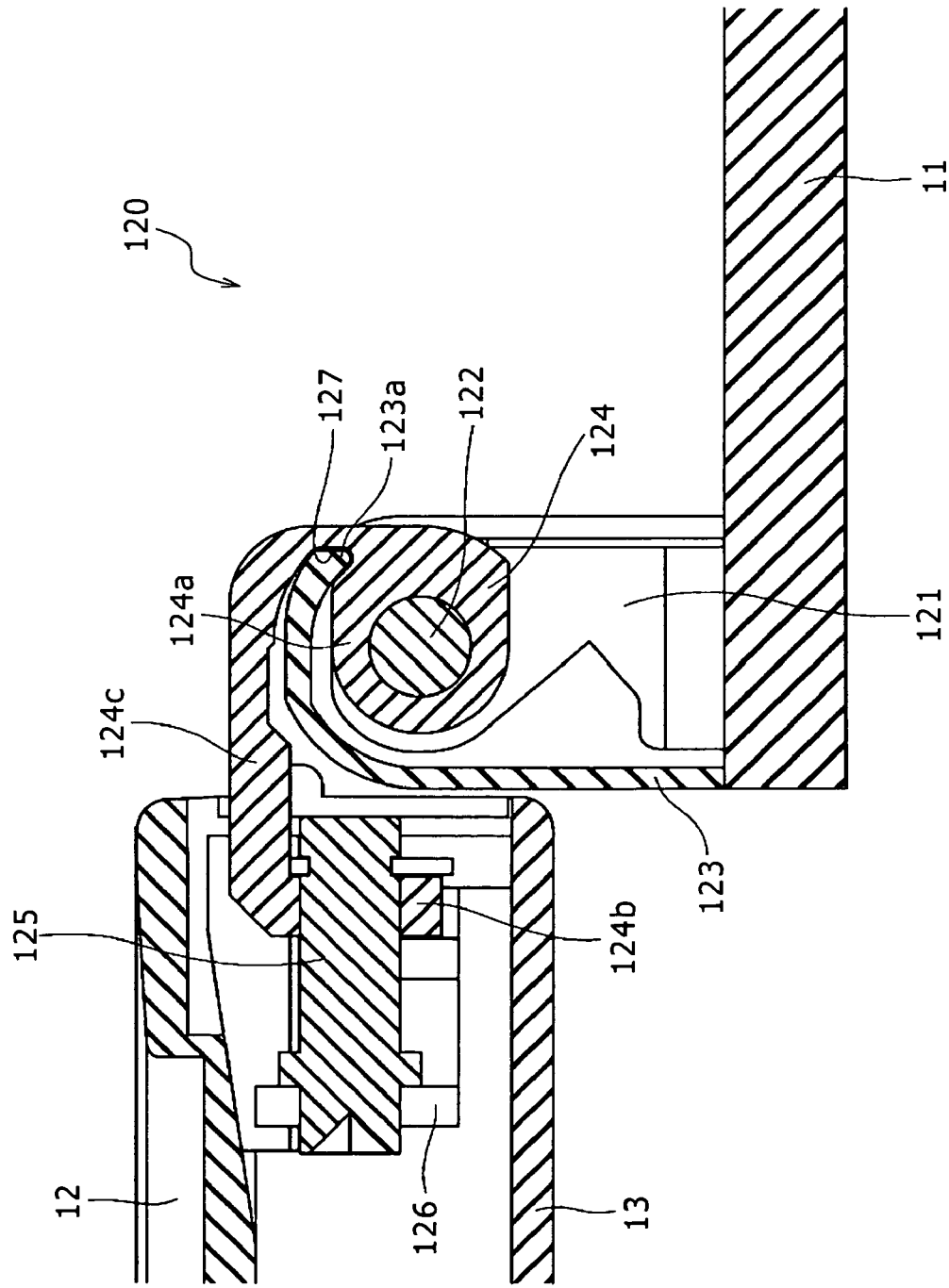
FIG. 16 is a sectional view showing a 180° opened state of the biaxial hinge mechanism for the video camera, as the second embodiment of the biaxial hinge mechanism according to the one embodiment of the present invention.
Figure 17:
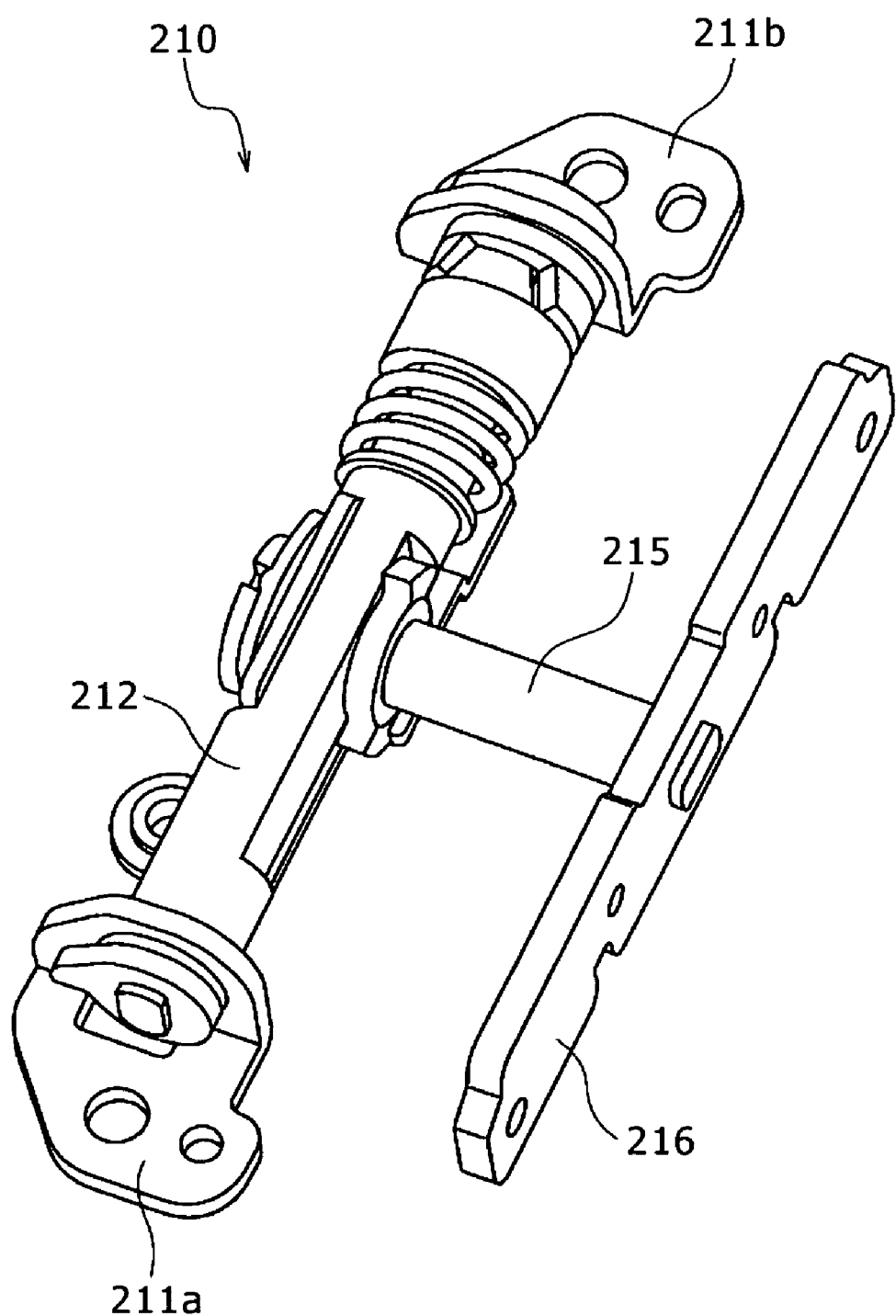
FIG. 17 is a perspective view showing a biaxial hinge mechanism according to a related art.
Figure 18:
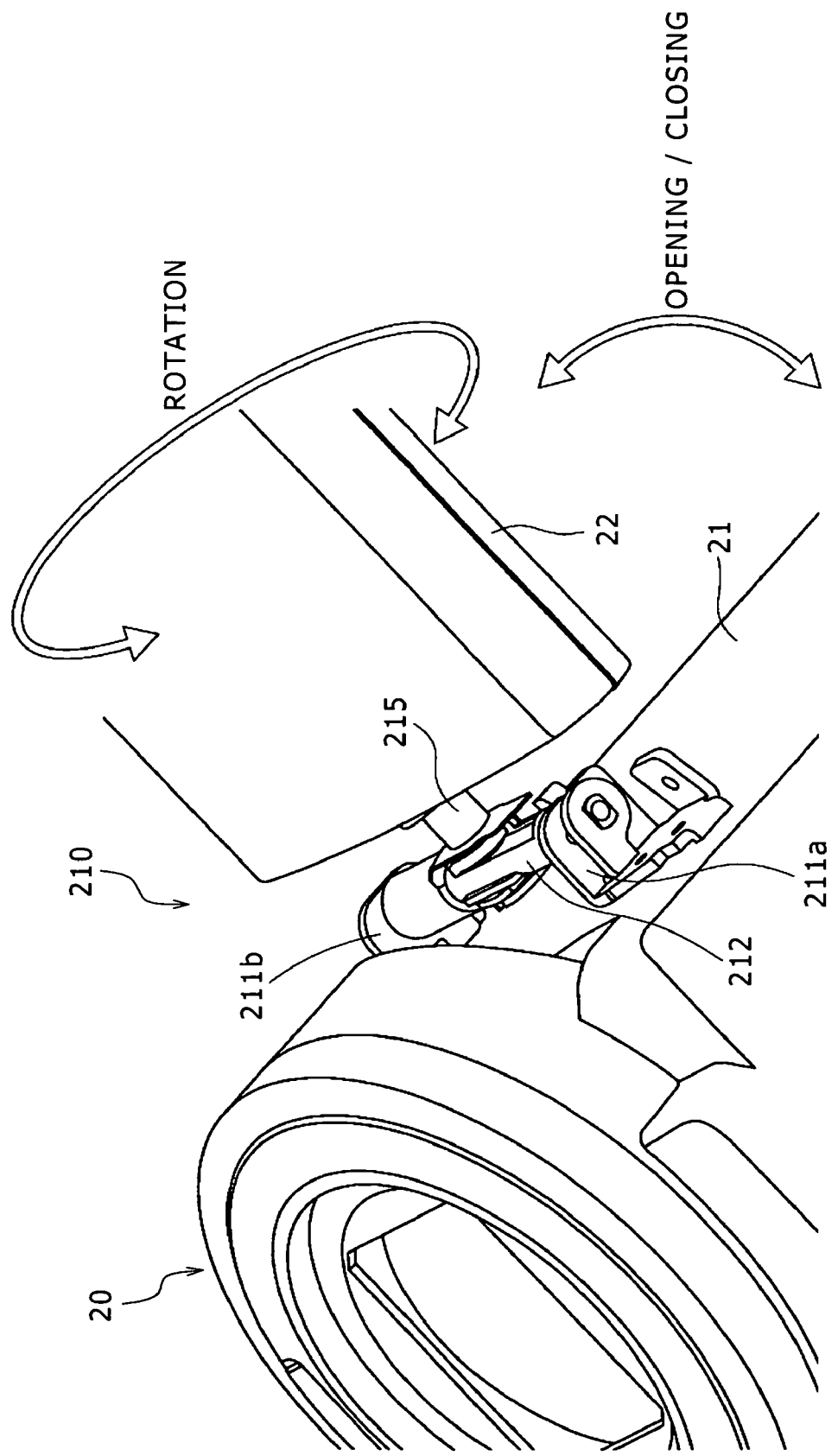
FIG. 18 is a perspective view showing a condition in which the biaxial hinge mechanism according to the related art shown in FIG. 17 is applied to a video camera.

FIG. 16 is a sectional view showing a 180° opened state of the biaxial hinge mechanism 120 for the video camera 10, as the second embodiment of the biaxial hinge mechanism according to an embodiment of the present invention.

The biaxial hinge mechanism 120 in the second embodiment shown in FIGS. 12 to 16 has a configuration in which the rotation angle (the opening/closing angle of the liquid crystal panel 12) is enlarged beyond 90° (the range of the rotation angle is changed to 0 to 180°), as compared with the biaxial hinge mechanism 110 in the first embodiment shown in FIGS. 4 to 10. Therefore, the biaxial hinge mechanism 120 in the second embodiment has an outer cover 123 and a hinge base 124 the shapes of which are different from those in the biaxial hinge mechanism 110 in the first embodiment above.

Here, the outer cover 123 is provided to be secured to the apparatus body 11, and the opening/closing support sections 121 and the opening/closing shaft 122 and the like are hidden by the single outer cover 123 alone. Therefore, the split lines 223 as in the case of the outer cover 220 according to the related art shown in FIG. 20 are absent in this second embodiment. Consequently, in the biaxial hinge mechanism 120 in the second embodiment shown in FIGS. 12 to 16, the outer cover 123 has an enhanced aesthetic appearance.

Thus, the biaxial hinge mechanism 120 in the second embodiment ensures that the opening/closing shaft 122 and the like in the inside thereof can be hidden by the single, non-split outer cover 123. In addition, the hinge base 124 supported on the opening/closing shaft 122 so as to be rotatable relative to the apparatus body 11, with the opening/closing shaft 122 as a center axis of rotation, is so shaped as not to interfere with the outer cover 123. Besides, the hinge base 124 is formed in such a shape that the rotating shaft 125 of the liquid crystal panel 12 is located on the outside of the outer cover 123.

Specifically, the hinge base 124 includes an opening/closing shaft insertion section 124a in which to insert the opening/closing shaft 122, a rotating shaft insertion section 124b in which to insert the rotating shaft 125, and a base section 124c roughly U-shaped in section as viewed along the axial direction of the opening/closing shaft 122. The opening/closing shaft insertion section 124a is projected from one end side of the roughly U-shaped form of the base section 124c toward the inside of the base section 124c, whereas the rotating shaft insertion section 124b is provided on the other end side of the roughly U-shaped form of the base section 124c.

In the biaxial hinge mechanism 120 as above, as the liquid crystal panel 12 is progressively opened from the normal closed state shown in FIG. 12, the hinge base 124 is accordingly rotated with the opening/closing shaft 122 as a center axis of rotation. Then, a rotating support section 126 as well as a liquid crystal panel 12 and a panel cover 13 which are provided to be secured to the rotating support section 126 is rotated away from the apparatus body 11, resulting in the 45° opened state shown in FIG. 13. In this case, the shapes of the opening/closing shaft insertion section 124a, the rotating shaft insertion section 124b, and the base section 124c of the hinge base 124 ensure a positional relationship in which a tip portion 123a of the outer cover 123 enters the roughly U-shaped form of the base section 124c. In other words, the hinge base 124 is provided with the roughly U-shaped base section 124c so as not to interfere with the outer cover 123.

Thus, even when the liquid crystal panel 12 is opened, the hinge base 124 would not interfere with the outer cover 123.

As the opened state transits to the 90° opened state shown in FIG. 14 and then to the 135° opened state shown in FIG. 15, the tip portion 123a of the outer cover 123 comes deeper into the roughly U-shaped form of the base section 124c of the hinge base 124. Further, when the 180° opened state shown in FIG. 16 is reached, a rotation-restricting section 127 abuts on the tip portion 123a of the outer cover 123. Therefore, the rotation angle of the hinge base 124 is restricted to within 180°.

In addition, the biaxial hinge mechanism 120 in the second embodiment is so configured that in its rotation range (0 to 180°), the opening/closing support sections 121, the opening/closing shaft 122, and the opening/closing shaft insertion sections 124a are always hidden by the outer cover 123. Further, a rotating shaft insertion section 124b, a rotating shaft 125, and the rotation support section 126 are moved on the outside of the outer cover 123, in the state of being hidden by the liquid crystal panel 12 and the panel cover 13.

Accordingly, like the biaxial hinge mechanism 110 in the first embodiment shown in FIGS. 4 to 10, the biaxial hinge mechanism 120 in the second embodiment shown in FIGS. 12 to 16 also has an enhanced aesthetic appearance at the opening/closing area of the liquid crystal panel 12. In addition, since the apparatus body 11 is provided with only one outer cover 123 for composing an outer cover, a reduction in the number of component parts is realized. Further, this structure prevents intrusion of foreign matter via the outer cover 123, which enhances reliability of the biaxial hinge mechanism 120. Furthermore, the outer cover 123 is prevented from interfering with the liquid crystal panel 12 or the panel cover 13 or the like at the times of opening and closing of the liquid crystal panel 12; thus, it is possible to prevent inconveniences in use, such as damaging of component parts, catching of a part on another part at the time of opening/closing, generation of a foreign sound, etc.

While some embodiments of the present invention have been described above, the present invention is not limited to the above embodiments, and various modifications such as the following are possible.

(1) While the video camera 10 has been mentioned as an example of the electronic apparatus in the above embodiments, this is not limitative, and the present invention is applicable also to various electronic apparatuses such as digital cameras, cell phones, notebook-sized personal computers, portable game machines, etc.

(2) While the biaxial hinge mechanism 110, 120 has been applied to the opening/closing part of the liquid crystal panel 12 in the above embodiments, this application is not limitative, and the biaxial hinge mechanism is applicable generally to any part which is connected to an apparatus body and which is desired to have functions for opening/closing and rotation.

Incidentally, it is desirable to provide an appropriate click feeling at each of start and end positions of opening/closing and rotation.

The present application contains subject matter related to that disclosed in Japanese Priority Patent Application JP 2010-132930 filed in the Japan Patent Office on Jun. 10, 2010, the entire content of which is hereby incorporated by reference.

What is claimed is:

1. A hinge base part, comprising:
an base section having an L-shaped configuration as viewed in cross section and having a first base section piece and a second base section piece, each one of the first and second base section pieces constructed generally as a panel having a pair of shortened sides disposed apart from and extending parallel to each other and a pair of elongated sides disposed apart from and extending parallel to each other and intersecting the pair of shortened sides to form a generally rectangular configuration, the first and second base section pieces integrally connected to each other along respective ones of the elongated sides thereby forming an intersection of the L-shaped configuration with the first base section piece extending in a first direction as viewed in cross-section from the intersection and the second base section piece extending in a second direction perpendicularly to the first direction as viewed in cross-section from the intersection;
a pair of opening/closing shaft insertion sections disposed apart from one another and connected to the first base section piece adjacent respective ones of the pair of shortened sides to project perpendicularly therefrom in the second direction, each one of the pair of opening/closing shaft insertion sections having a shaft insertion receiving hole with respective ones of the shaft insertion receiving holes being axially aligned with one another; and
a rotating shaft insertion section connected to the second base piece adjacent the elongated side disposed opposite the intersection and generally centrally between the pair of opening/closing shaft insertion sections, the rotating shaft insertion section extending in the first direction to form a generally U-shaped configuration as viewed in cross-section with the base section, the rotating shaft insertion section having a rotating shaft receiving hole formed therethrough and facing the first base section piece.

2. A biaxial hinge mechanism, comprising:
an opening/closing support section having a pair of shaft receiving sections disposed apart from one another, each one of the shaft receiving sections having an opening/closing support section shaft receiving hole, respective ones of the opening/closing support section shaft receiving holes being axially aligned with one another;
a hinge base part disposed between the pair of shaft receiving sections and including:
an base section having an L-shaped configuration as viewed in cross section and having a first base section piece and a second base section piece, each one of the first and second base section pieces constructed generally as a panel having a pair of shortened sides disposed apart from and extending parallel to each other and a pair of elongated sides disposed apart from and extending parallel to each other and intersecting the pair of shortened sides to form a generally rectangular configuration, the first and second base section pieces integrally connected to each other along respective ones of the elongated sides thereby forming an intersection of the L-shaped configuration with the first base section piece extending in a first direction as viewed in cross-section from the intersection and the second base section piece extending in a second direction perpendicularly to the first direction as viewed in cross-section from the intersection;
a pair of opening/closing shaft insertion sections disposed apart from one another and connected to the first base section piece adjacent respective ones of the pair of shortened sides to project perpendicularly therefrom in the second direction, each one of the pair of opening/closing shaft insertion sections having a shaft insertion receiving hole with respective ones of the shaft insertion receiving holes being axially aligned with one another; and a rotating shaft insertion section connected to the second base piece adjacent the elongated side disposed opposite the intersection and generally centrally between the pair of opening/closing shaft insertion sections, the rotating shaft insertion section extending in the first direction to form a generally U-shaped configuration as viewed in cross-section with the base section, the rotating shaft insertion section having a rotating shaft receiving hole formed therethrough and facing the first base section piece;

an opening/closing shaft sized and adapted to extend into and through the opening/closing support section shaft receiving holes and the shaft insertion receiving holes thereby allowing the hinge base part to rotate about the opening/closing shaft relative to the opening/closing support section; and a rotating shaft rotatably received in the rotating shaft receiving hole of the rotating shaft insertion section.

3. An electronic apparatus, comprising:

a casing with electronic parts disposed inside thereof; and a biaxial hinge mechanism including:

an opening/closing support section connected to the casing and having a pair of shaft receiving sections projecting away from the casing and disposed apart from one another, each one of the shaft receiving sections having an opening/closing support section shaft receiving hole, respective ones of the opening/closing support section shaft receiving holes being axially aligned with one another;

a hinge base part disposed between the pair of shaft receiving sections and including:

an base section having an L-shaped configuration as viewed in cross section and having a first base section piece and a second base section piece, each one of the first and second base section pieces constructed generally as a panel having a pair of shortened sides disposed apart from and extending parallel to each other and a pair of elongated sides disposed apart from and extending parallel to each other and intersecting the pair of shortened sides to form a generally rectangular configuration, the first and second base section pieces integrally connected to each other along respective ones of the elongated sides thereby forming an intersection of the L-shaped configuration with the first base section piece extending in a first direction as viewed in cross-section from the intersection and the second base section piece extending in a second direction perpendicularly to the first direction as viewed in cross-section from the intersection;

a pair of opening/closing shaft insertion sections disposed apart from one another and connected to the first base section piece adjacent respective ones of the pair of shortened sides to project perpendicularly therefrom in the second direction, each one of the pair of opening/closing shaft insertion sections having a shaft insertion receiving hole with respective ones of the shaft insertion receiving holes being axially aligned with one another; and a rotating shaft insertion section connected to the second base piece adjacent the elongated side disposed opposite the intersection and generally centrally between the pair of opening/closing shaft insertion sections, the rotating shaft insertion section extending in the first direction to form a generally U-shaped configuration as viewed in cross-section with the base section, the rotating shaft insertion section having a rotating shaft receiving hole formed therethrough and facing the first base section piece;

an opening/closing shaft sized and adapted to extend into and through the opening/closing support section shaft receiving holes and the shaft insertion receiving holes thereby allowing the hinge base part to rotate about the opening/closing shaft relative to the opening/closing support section; and a rotating shaft rotatably received in the rotating shaft receiving hole of the rotating shaft insertion section.

* * * * *